US008175336B2

(12) United States Patent
Kizuki et al.

(10) Patent No.: US 8,175,336 B2
(45) Date of Patent: May 8, 2012

(54) TARGET TRACKER

(75) Inventors: Takafumi Kizuki, Yokohama (JP); Yoshitaka Sakurai, Yokohama (JP)

(73) Assignee: JVC Kenwood Corporation, Yokohama (JP)

( * ) Notice: Subject to any disclaimer, the term of this patent is extended or adjusted under 35 U.S.C. 154(b) by 336 days.

(21) Appl. No.: 12/654,093

(22) Filed: Dec. 10, 2009

(65) Prior Publication Data

US 2010/0150401 A1 Jun. 17, 2010

(30) Foreign Application Priority Data

Dec. 16, 2008 (JP) ................. P2008-319713

(51) Int. Cl.
*G06K 9/00* (2006.01)
(52) U.S. Cl. ............. 382/103; 382/100; 382/162
(58) Field of Classification Search .......... 382/100, 382/103, 162
See application file for complete search history.

(56) References Cited

U.S. PATENT DOCUMENTS

| 7,835,542 | B2 * | 11/2010 | Lin et al. | 382/103 |
| 2008/0063236 | A1 * | 3/2008 | Ikenoue et al. | 382/103 |
| 2009/0175500 | A1 * | 7/2009 | Kizuki et al. | 382/103 |
| 2010/0296697 | A1 * | 11/2010 | Ikenoue | 382/103 |

FOREIGN PATENT DOCUMENTS

| JP | 08-009227 A | 1/1996 |
| JP | 2000-048211 A | 2/2000 |
| JP | 2004-282535 | 10/2004 |
| JP | 2007-272436 A | 10/2007 |
| JP | 2008-283379 A | 11/2008 |

OTHER PUBLICATIONS

K. Nummiaro, E. Koller-Meier and L. Van Gool, "An Adaptive Color-Based Particle Filter, Image and Vision Computing," Jan. 10, 2003, v.21, issue 1, pp. 99-110.*
Isard, M., et al. "Condensation—conditional density propagation for visual tracking"; Int. J. Computer Vision; in press 1998; pp. 1-36.
Official Action, issued on Jan. 4, 2011, in the counterpart Japanese application.

* cited by examiner

*Primary Examiner* — Andrew W Johns
*Assistant Examiner* — Shefali Goradia
(74) *Attorney, Agent, or Firm* — The Nath Law Group; Jerald L. Meyer; Stanley N. Protigal

(57) ABSTRACT

For a tracking of a target object in a time series of frames of image data, a tracking object designation acceptor accepts a designation of a tracking object, a target color setter sets a color of the designated tracking object as a target color, and a particle filter processor employs particles for measurements to determine color likelihoods by comparison between the target color and colors in vicinities of particles, works, as the color likelihoods meet a criterion, to estimate a region of the tracking object in a frame of image data in accordance with results of the measurements, and as the color likelihoods fails to meet the criterion, to use particles, for measurements to determine luminance likelihoods based on luminance differences between frames of image data in a time series of frames of image data, and estimate a region of the tracking object in a frame of image data in accordance with results of the measurements, and updates the target color by a color in either estimated region.

6 Claims, 19 Drawing Sheets

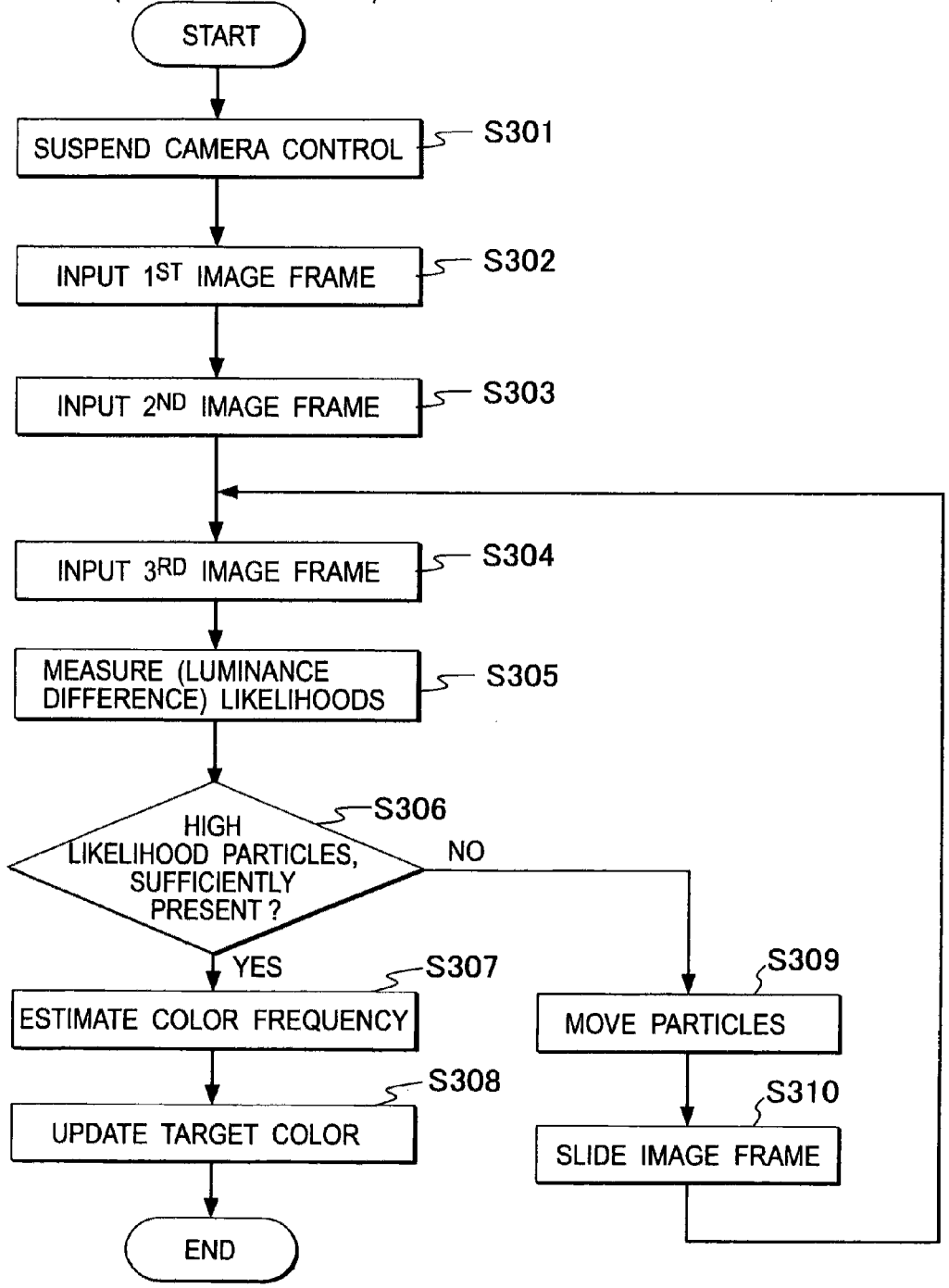

FIG. 7A
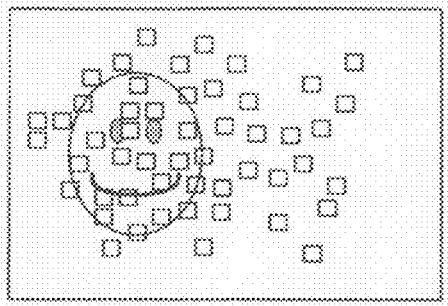
1ST IMAGE FRAME
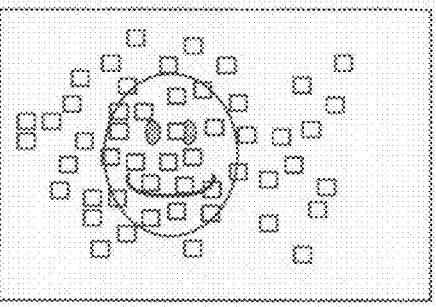
2ND IMAGE FRAME
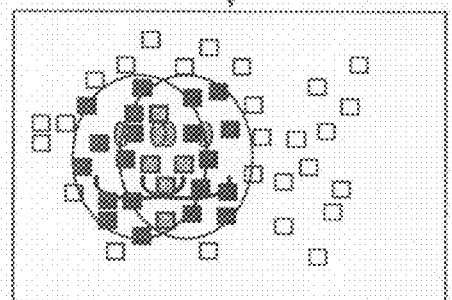
1ST COMMON FRAME FOR MEASUREMENT OF LIKELIHOOD Y1 BASED ON LUMINANCE DIFFERENCE BETWEEN 1ST IMAGE FRAME AND 2ND IMAGE FRAME
FIG. 7B
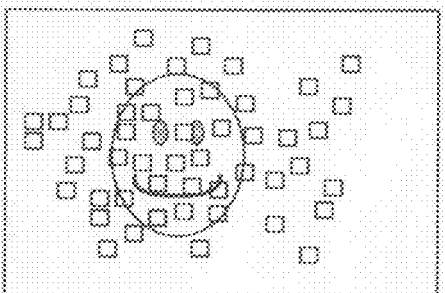
2ND IMAGE FRAME
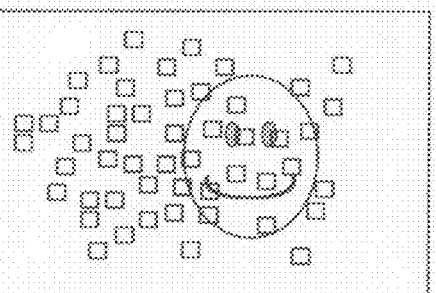
3RD IMAGE FRAME
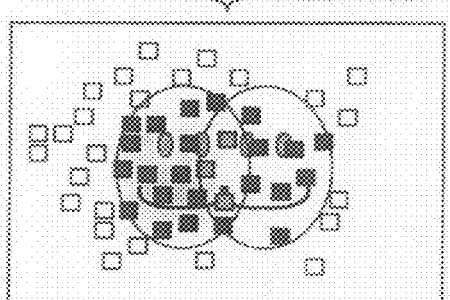
2ND COMMON FRAME FOR MEASUREMENT OF LIKELIHOOD Y2 BASED ON LUMINANCE DIFFERENCE BETWEEN 2ND IMAGE FRAME AND 3RD IMAGE FRAME FIG. 8
1ST COMMON FRAME FOR LIKELIHOOD Y1 BASED ON LUMINANCE DIFFERENCE BETWEEN 1ST IMAGE FRAME AND 2ND IMAGE FRAME
2ND COMMON FRAME FOR LIKELIHOOD Y2 BASED ON LUMINANCE DIFFERENCE BETWEEN 2ND IMAGE FRAME AND 3RD IMAGE FRAME
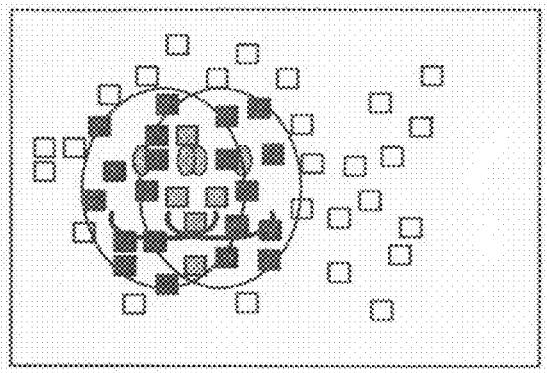 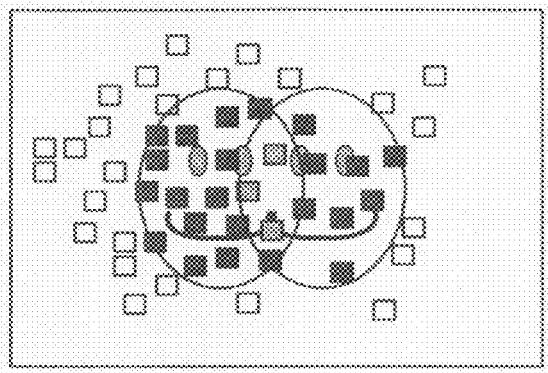
3RD COMMON FRAME
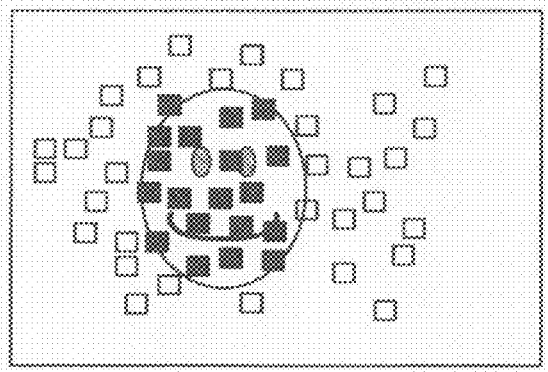
LIKELIHOOD YD = LIKELIHOOD Y1 AND LIKELIHOOD Y2

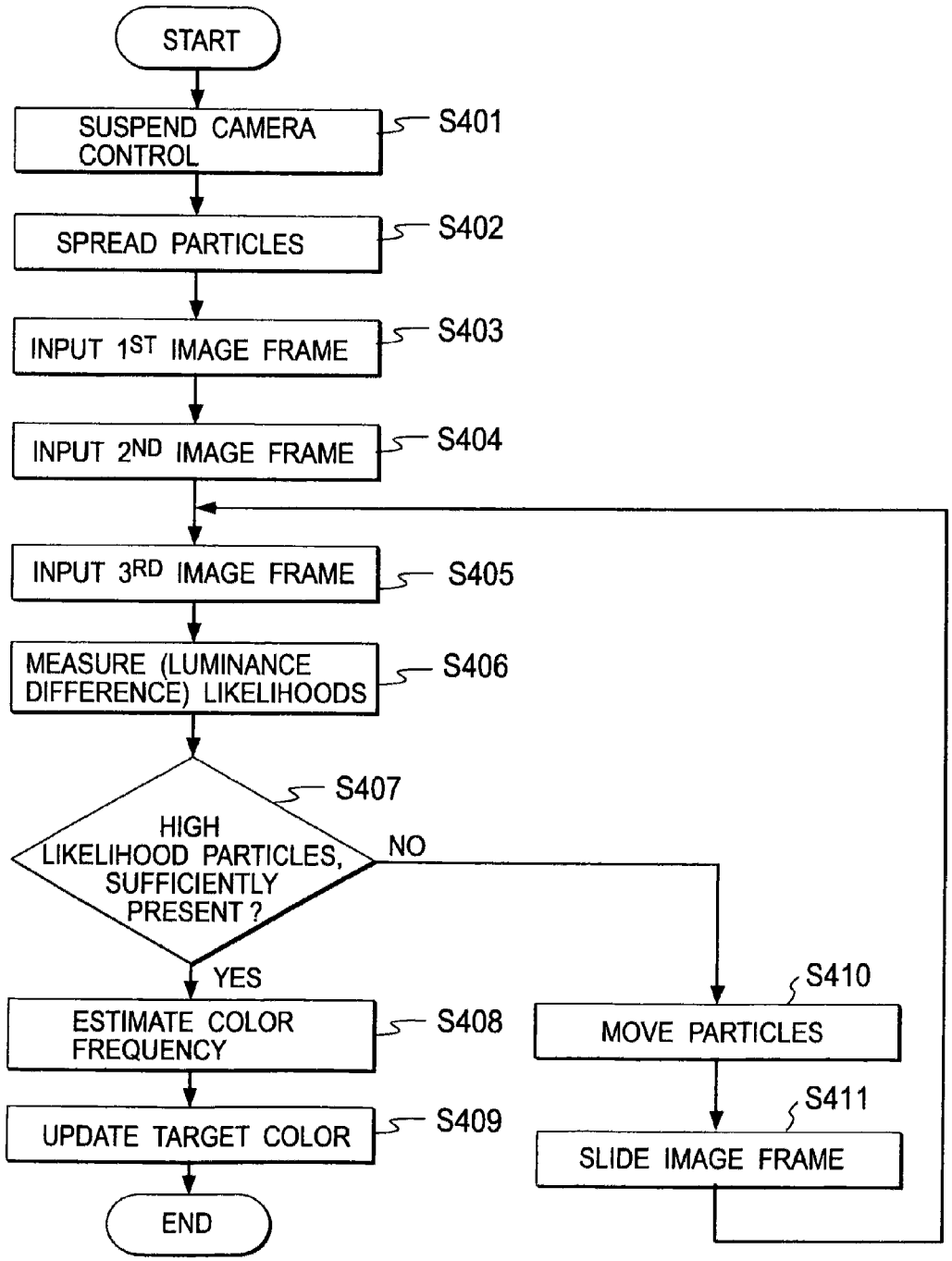

TARGET TRACKER

BACKGROUND OF THE INVENTION

1. Field of the Invention

The present invention relates to a target tracker, and particularly, to a target tracker adapted to track a target object in a time series of frames of image data.

2. Description of the Related Arts

There are practical applications of camera systems making use of images picked up by a camera in a variety of situations, as represented by a picture monitoring system or video conference system. Some of such camera systems have a tracking function of automatically tracking a preset target object, to pick it up, while changing an imaging region of camera. For instance, there are picture monitoring systems provided with a tracking function and adapted, once a suspicious person is caught as a target object, to continue imaging, while tracking the person to pick up in a picture. Further, there are video conference systems provided with a tracking function and adapted to pick up conference images tracking a focused person.

Tracking a target object to pick up images thereof needs three camera to have a pan, tilt, zoom, and the like controlled in accordance with a displacement of the object, to keep this within an angle of field to be imaged. For the implementation, there should be recognition of a target object in images, to detect a direction of displacement of the same.

As techniques for recognition of a target object in images to detect a displacement direction thereof, there were various methods employed in the past, including a frame difference method or a background difference method making use of a difference in luminance, while instead, in recent years there have been studies on target tracking techniques using a particle filter, as disclosed in the patent document 1 (Japanese Patent Application Laid-Open Publication No. 2004-282535) and the non-patent document 1 (CONDENSATION—conditional density propagation for visual tracking, M. Isard, and A. Blake, Int. J. Computer vision, vol. 28, No. 1, pp. 5-28 (1998)).

The particle filter is a technique for approximate calculation by a Bayesian filter making use of a posterior probability, which employs a finite number of particles for expression of a function of probability distribution to predict a time sequence. In other words, the particle filter, being a sort of sequential Mote Carlo method based on a sampling, makes approximation of a time series of distributions in terms of sets of particle positions and weights, allowing for a tracking even of such a distribution that will not be approximated by a Gaussian. Further, it allows various amounts of characteristics of time series to be handled as likelihoods, and has a wide range of applications. In an application to a tracking of target object, there have been measurements of likelihoods using a color of target object, as disclosed in the patent document 1, as well. In this case, likelihoods were measured depending on how many pixels residing within vicinities of particles are approximate in color to the color of target object, with results of measurements affording to estimate a position of target object.

SUMMARY OF THE INVENTION

There were tracking processes for tracking a target object by using a particle filter, as described, which had a color of the target object set up by selection, and increased likelihoods of particles located in a vicinity of the color, thereby tracking the target object.

However, the target object was an image output from a camera, which had no true colors, but was apparently changed in color by adjustments to the camera, such as those of white balance and exposure, for instance. Apparent colors of any target object were changed also by how rays of light struck the object, how the object was shadowed, etc. Using an initially set color of target object in a continued tracking was thus difficult, in particular in environments subjected to large variations of light, such as outdoors, or in sunlight even indoors.

The patent document 1 has disclosed restudying a color of a specific object to thereby implement an adaptation to a variation in color of the object due to a changed condition of illumination or the like. However, this was no more than predicting a location of the specific object in each frame, to update a color in the region, and unable to be always effective for the precision of tracking to be enhanced upon apparent color changes. In particular, it was unable to cope with sudden changes of apparent colors.

The present invention has been devised in view of such situations, and it is an object of the present invention to provide a target tracker allowing for an enhanced precision of tracking even of a target object having changed apparent colors.

To achieve the object described, according to an aspect of the present invention, a target tracker is adapted for a tracking of a target object in a time series of frames of image data, the target tracker comprising a tracking object designation acceptor configured to accept a designation of a tracking object to be the target object in the time series of frames of image data, a target color setter configured to set a color for the tracking of the target object in the time series of frames of image data as a target color, and a particle filter processor having a set of particles movable in the time series of frames of image data in accordance with a prescribed rule, the particle filter processor being configured to apply a first subset of the set of particles to a first frame of image data in the time series of frames of image data, for a first set of measurements to determine a set of color likelihoods by comparison between the target color and colors in vicinities of particles of the first subset of particles in the first frame of image data, the particle filter processor being adapted, as the set of color likelihoods meets a prescribed criterion, to estimate a first region of the tracking object in the first frame of image data in accordance with the set of color likelihoods, and as the set of color likelihoods fails to meet the prescribed criterion, to apply a second subset of the set of particles to one or more frames of image data in the time series of frames of image data, for a second set of measurements to determine a set of luminance likelihoods based on luminance differences between frames of image data in the time series of frames of image data, and estimate a second region of the tracking object in a second frame of image data in the time series of frames of image data in accordance with the set of luminance likelihoods, the particle filter processor being configured to update the target color by a color in the first region or the second region, whichever is estimated.

The particle filter processor may be adapted to apply the second subset of particles fixed in position to frames of image data in the time series of frames of image data for the second set of measurements. Or the particle filter processor may be adapted to apply the second subset of particles spread to rearrange to a frame of image data in the time series of frames of image data for the second set of measurements.

The particle filter processor may be configured to calculate a color data change rate between a color data of the target color and a color data of a color in the first region or the second region, whichever is estimated, and the particle filter processor may be adapted, as the color data change rate is equal to or greater than a reference value, to apply the second subset of particles spread to rearrange to a frame of image data in the time series of frames of image data for the second set of measurements, and as the color data change rate is smaller than the reference value, to apply the second subset of particles fixed in position to frames of image data in the time series of frames of image data for the second set of measurements.

To achieve the object described, according to another aspect of the present invention, a target tracker is adapted for a tracking of a target object in a time series of frames of image data, the target tracker comprising a tracking object designation acceptor configured to accept a designation of a tracking object to be the target object in the time series of frames of image data, a target color setter configured to set a color for the tracking of the target object in the time series of frames of image data as a target color, a tracking color storer configured to store a latest color for the tracking of the target object in the time series of frames of image data as a tracking color, and a particle filter processor having a set of particles movable in the time series of frames of image data in accordance with a prescribed rule, the particle filter processor being configured to apply a first subset of the set of particles to a first frame of image data in the time series of frames of image data, for a first set of measurements to determine a set of color likelihoods by comparison between the target color and colors in vicinities of particles of the first subset of particles in the first frame of image data, the particle filter processor being adapted, as the set of color likelihoods meets a prescribed criterion, to estimate a first region of the tracking object in the first frame of image data in accordance with the set of color likelihoods, and store a color of the first region as the tracking color in the tracking color storer, as the set of color likelihoods fails to meet the prescribed criterion, to apply a second subset of the set of particles to one or more frames of image data in the time series of frames of image data, for a second set of measurements to determine a set of luminance likelihoods based on luminance differences between frames of image data in the time series of frames of image data, and estimate a second region of the tracking object in a second frame of image data in the time series of frames of image data in accordance with the set of luminance likelihoods, the particle filter processor being configured to perform an evaluation of colors involved in the first region or the second region, whichever is estimated, in terms of frequencies thereof using a combination of the target color and the tracking color stored in the tracking color storer, and update the target color by one of the colors being highest in the evaluation.

The particle filter processor may be configured for evaluation to be lower in frequency as an evaluated color has increased differences to the target color and the tracking color.

BRIEF DESCRIPTION OF THE DRAWINGS

FIG. 5 is a flowchart of control actions of a target color update process in the target tracking process according to the first embodiment.

FIGS. 7A and 7B are illustrations of likelihood measurements using luminance differences in the target color update process according to the first embodiment, respectively.

FIG. 8 is an illustration of a likelihood measurement using a luminance difference in the target color update process according to the first embodiment.

FIG. 10 is a flowchart of control actions of a target color update process in a target tracking process according to the second embodiment.

DETAILED DESCRIPTION OF THE EMBODIMENTS (First Embodiment)

Figure 1:
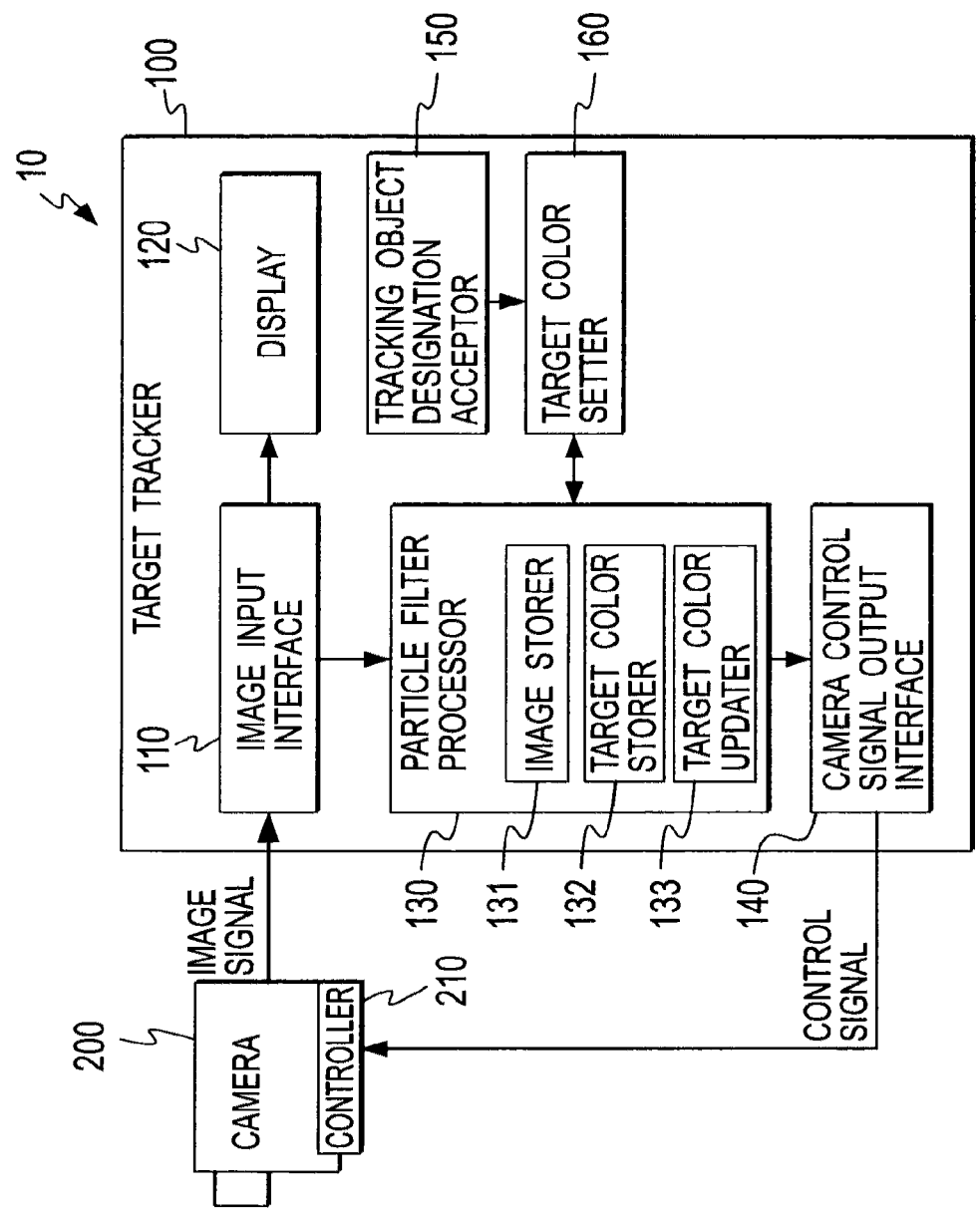
FIG. 1 is a block diagram of configuration of a target tracking system including a target tracker according to a first embodiment of the present invention.

There will de described preferred embodiments of the present invention with reference to the drawings. FIG. 1 is a block diagram of configuration of a target tracking system 10 including a target tracker 100 according to a first embodiment of the present invention. As illustrated in the figure, the target tracking system 10 includes: the target tracker 100; a camera 200 configured for picking up an angle of view to output signals of a frame of image; and a controller 210 adapted to implement pan and tilt control and zoom factor control of the camera 200 in accordance with control signals from the target tracker 100.

The target tracker 100 includes: an image input interface 110 configured to input image signals output from the camera 200; a display 120 configured to display a picture based on a frame of input signals; a particle filter processor 130 configured for a process of tracking a target object by use of a particle filter; a camera control signal output interface 140 configured for responding to a result of the tracking by generating a set of control signals for controlling the camera 200, to output to the controller 210; a tracking object designation acceptor 150 configured for acceptance of an object to be tracked in a frame of image displayed on the display 120; and a target color setter 160 configured to set up a target color in correspondence to a designated tracking object.

The particle filter processor 130 includes: an image storer 131 adapted for storage of three frames of image data to be processed in the process of tracking a target object by use of a particle filter; a target color storer 132 adapted for storage of a target color as set up; and a target color updator 133 adapted, as the tracking object has an apparent color changed so the tracking by the set color is difficult, to estimate a current position of the tracking object based on luminance differences between image frames having a temporal difference, for acquisition of a color from the region to thereby update the target color.

It is noted that the target tracker 100 may be composed of a general-purpose information processor that is provided with a CPU, a memory, an input/output interface, a communication processor, etc. There may be a general-purpose information processor such as a personal computer adapted for execution of programs developed for implementation of the above-noted functional components, to work as the target tracker 100. The target tracker 100 may well be constituted as a dedicated device.

There is an image-tracking algorithm employed in a particle filter, such as that introduced by the non-patent document 1, which will be described. The image-tracking algorithm is architected as a method of tracking a target object by approximating a position of the target object in an image frame at a time t as estimation in terms of a posterior probability density $p(x_t|z_t)$ by a set of N particles each defined as a state x with a weight $\pi$, such that $S_t^{(i)} = \{x_t^{(i)}, \pi_t^{(i)}\}$ for i=1, N, where the state quantities $x_t^{(i)}, \pi_t^{(i)}$ of an arbitrary i-th particle in the image frame at time t represent a likelihood as a weight of this.

Given an observation value of likelihood $z_t$ from the image frame at time t, the target object is representative by a probability density having the state $x_t$ as a stochastic variable, which is the above-noted posterior probability density [Math 1]. This [Math 1] can be reduced by using the Bayes' theorem, such that $p(x_t|z_t) = \alpha p(x_t|z_t) p(x_t|z_{t-1})$, where $\alpha$ is a constant for normalization.

The non-patent document 1 has shown a condensation algorithm in which, for a respective image frame, the process of tracking a target object is implemented by a repeated sequence of three steps being a selection, a prediction, and a measurement.

More specifically, the selection step includes having a system of particles dispersed to locate about the target object, measuring likelihoods of the particles, and selecting N particles according to height of likelihood, with probabilities commensurate with heights of their likelihoods. The prediction step includes randomly spreading high-likelihood particles selected by the selection step, for their rearrangement. The measurement step includes determining, by calculation for each particle, how many pixels within a vicinity thereof are approximate in color to the target object, as a likelihood of the particle. This is followed by calculation of a weighted average of likelihoods of whole particles, to estimate the position of the target object. The likelihoods of particles may be considered as likelihoods observed within vicinities of the particles as apparent tendencies with respect to a known parameter (e.g. color, luminance) of an unknown event (e.g. movement of the target object).

According to the present embodiment, the target tracker 100 allows for an enhanced target tracking performance of a particle filter processor employing such the algorithm, by implementing the following processes. It is noted that the present embodiment addresses an image tracking process using a particle filter, and is applicable to a variety of modified algorithms, without being restricted to the above-noted algorithm.

Figure 2:
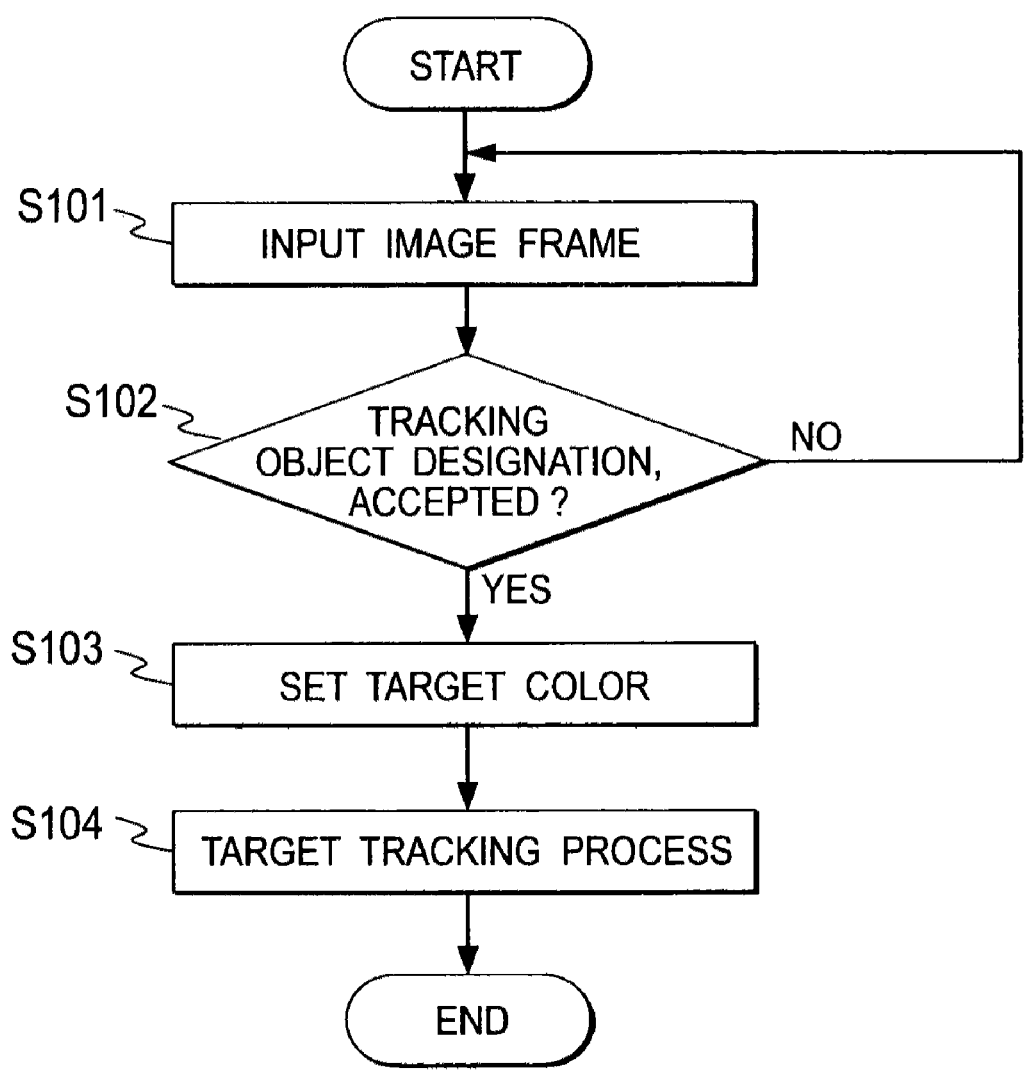
FIG. 2 is a flowchart of control actions of the target tracker according to the first embodiment.

FIG. 2 is a flowchart of control actions of the target tracker 100. The camera 200 is configured to sequentially output pixel signals of image frames, as image signals, which are input at a step S101 to the target tracker 100 by the frame as a unit. At a step S102, the target tracker 100 is adapted to sequentially display, on the display 120, sets of image signals of input frames, as a time sequence of pictures, waiting for designation of a target object. Under this condition, any authorized operator can designate any image in any picture that the operator wants to track, as the target object.

The designation of a target object is effected by an operator's indication of a region of a corresponding image on the display 120, through an input interface such as a mouse or pointer, and is accepted by the tracking object designation acceptor 150. The display 120 may well be configured as a touch panel type display for acceptance by recognition of a region touched by an operator for designation. Or alternatively, there may be designation of a tracking object accepted through an external device.

If designation of any target object is accepted (Yes at the step S102), the control flow goes to a step S103, where the target color setter 160 is adapted for acquisition of a pixel color corresponding to a region defined by an accepted designation in a displayed image frame, to set it as a target color. The target color may be set in accordance with a set of RGB values of a single pixel in the designated region, or with a set of RGB values as averages or the like of pixels in the designated region. The target color as set up is stored by and in the target color storer 132, and one associated image frame is stored by and in the image storer 131.

In this embodiment, the particle filter processor 130 is configured for a process of calculating likelihoods of colors at particle locations relative to the target color in an HSV color space represented by a combination of hue (H), color saturation (S), and luminosity value (V), and is adapted for color conversion from an RGB color space of pixels into the HSV color space, when setting a target color. It may be configured for such a process in the pixels' RGB color space, in a YUV color space, or the like. Then, at a step S104, the target tracker 100 executes a target tracking process for controlling the camera 200 with a maintained recognition of a tracking object in a sequence of input image frames.

There will be described the target tracking process according to this embodiment. This embodiment is adapted to cope with a situation of a tracking object having changed apparent colors constituting a difficulty in the tracking to be continued by a current target color, by detecting a movement or displacement in terms of luminance differences between image frames different in time, for estimation of a location of the tracking object and acquisition of a new color from the region, to take it as the next color to update the target color, to restart a successive target tracking process using the updated target color.

Figure 3:
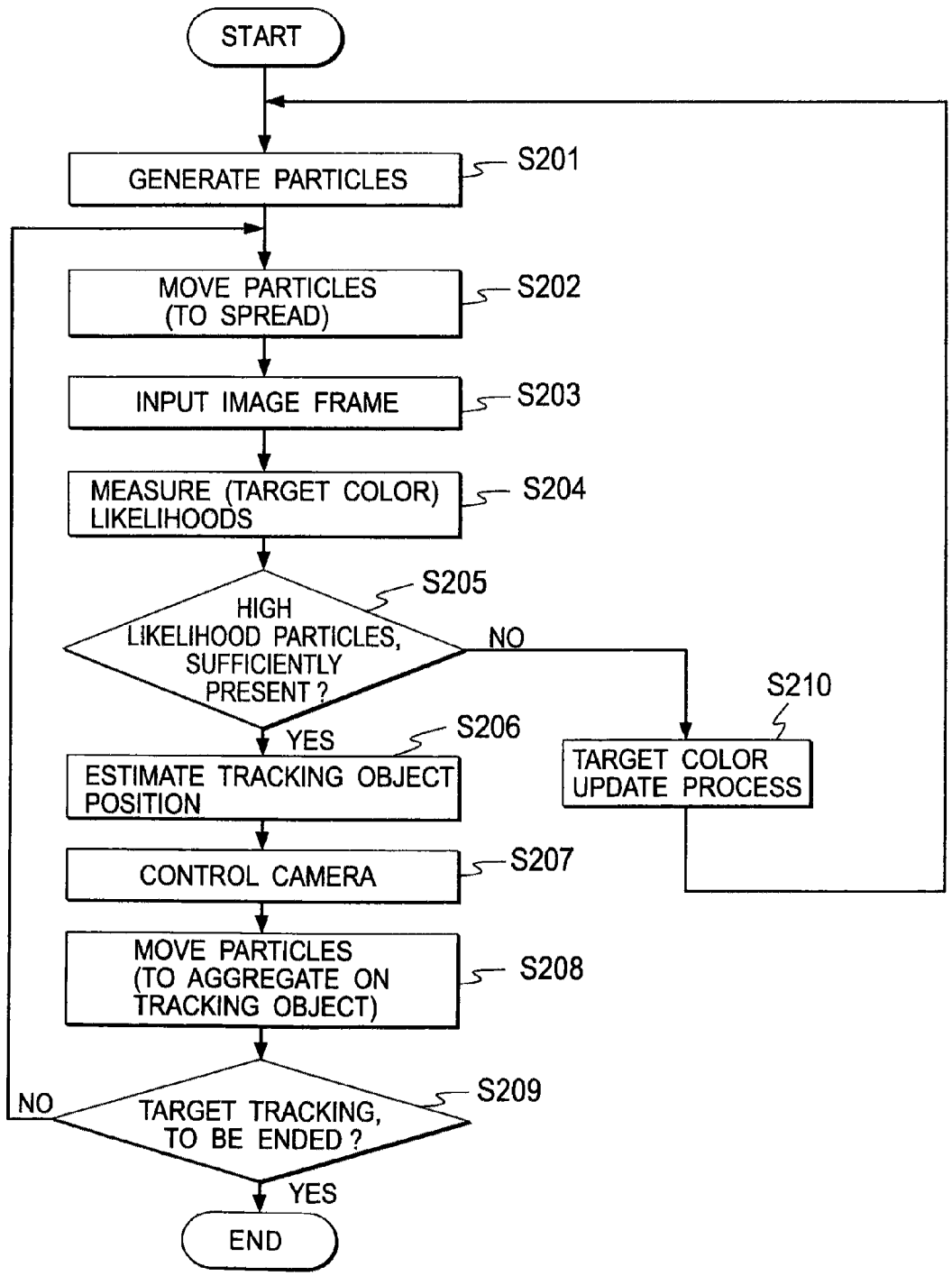
FIG. 3 is a flowchart of control actions of a target tracking process of the target tracker according to the first embodiment.

FIG. 3 is a flowchart of control actions for the target tracking process. It is noted that the present embodiment is applicable without restriction to a specific particle filtration algorithm illustrated in FIG. 3. FIGS. 4A to 4E are illustrations of specific image frames and particles in the target tracking process, respectively. The illustrations of FIGS. 4A to 4E have a person's face designated as a tracking object, and a face color set up as a target color.

Figure 4A:
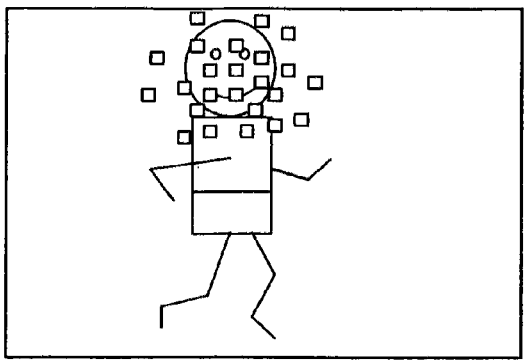
FIGS. 4A to 4E are illustrations of specific image frames and particles in the target tracking process according to the first embodiment, respectively.
Figure 4B:
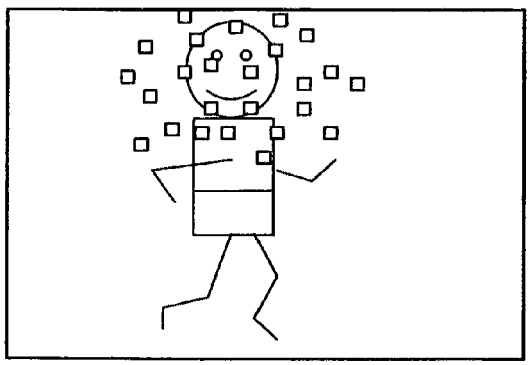

At a step S201, the particle filter processor 130 is adapted to generate particles within a vicinity of a region designated as a tracking object in an image frame of an initial state that has accepted a designation of the tracking object in a process at the step S102 in FIG. 2. The accuracy of tracking depends on the number of generated particles, and has a tradeoff relation with the processing rate. FIG. 4A illustrates a multiplicity of particles generated within a vicinity of a person's face as the tracking object.

Next, at a step S202, generated particles are moved to spread in accordance with a prescribed rule. If the tracking object has a predictable direction of movement, then particles will be moved in a direction according to a predicted direction of movement. In this embodiment, however, the tracking object is supposed as a suspicious individual in monitor frames, assuming random dynamic motions. Accordingly, respective particles are removed at distances determined in accordance with a standard normal distribution of random numbers. As a result, as in FIG. 4B, particles are dispersed about the person's face.

Figure 4C:
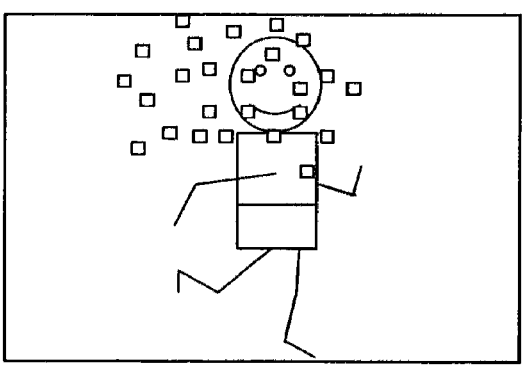
Figure 4D:
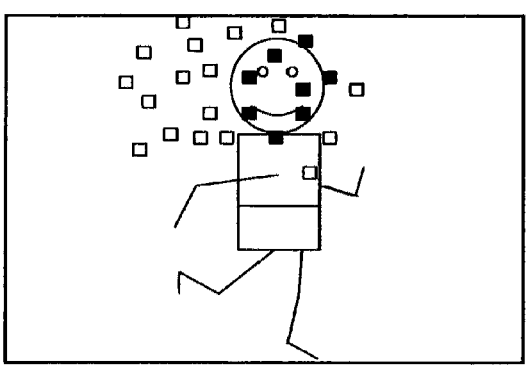
Figure 4E:
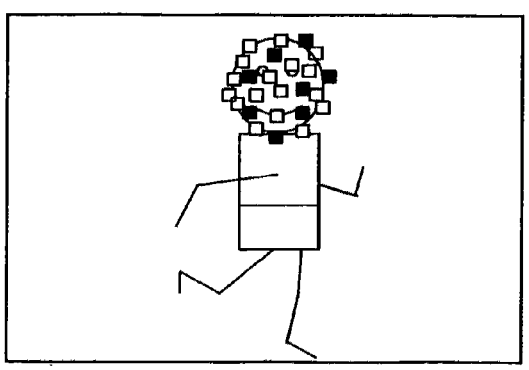

Then, at a step S203, the next frame of image is input. This image frame is to be processed as an image frame for detection such as of movement of the tracking object. FIG. 4C illustrates this image frame being displayed in a superimposed relationship with the spread particles. In the illustrated image frame, the tracking object is assumed as moving rightward. In the image frame being processed, each particle has a vicinity, e.g., a rectangular region about a location thereof. The vicinity covers a number of pixels residing therein, including a number of pixels having colors near to the target color. At a step S204, the particle filter processor 130 is adapted to measure that pixel number and this pixel number, and calculate a proportion of the latter to the former, to provide a result as a likelihood of the particle. The particle filter processor 130 may employ any process equivalent to the step S204 to determine a likelihood of the particle. For instance, it may prepare an HSV histogram of pixels in the rectangular region for use in calculation of a similarity to the target color to determine a likelihood of each particle. FIG. 4D indicates black particles as high-likelihood particles.

The tracking object may occasionally experience an irregular situation, such as getting in a shade, or being accompanied by a change of light source or in environment, having apparent colors thereof significantly changed. In such a case, particles may have decreased likelihoods, with a resultant insufficiency in proportion of high-likelihood particles. Insufficient proportions of high-likelihood particles may cause a reduced accuracy in the target tracking using a target color.

To this point, according to the present embodiment, the target tracking using a target color has a sufficient accuracy secured at a step S205, where it determines whether or not the spread particles include a sufficient proportion of high-likelihood particles. For determination of inclusion of a sufficient proportion of high-likelihood particles, there is a criterion provided for particles having likelihoods equal to or higher than a reference likelihood preset as a threshold, such that the proportion should be equal to or greater than a reference proportion prescribed as a threshold being 20%, for instance. The reference proportion as well as the reference likelihood may be set up as necessary.

If it is determined that high-likelihood particles are sufficiently present (Yes at the step S205), then the tracking using a target color should have a high accuracy, and the control flow goes to a step S206 for calculation of a weighting average of likelihoods of the spread particles, to estimate a region of the tracking object in the image frame being processed. The example illustrated in FIG. 4D indicates black particles located within a region that corresponds to an estimated region of the tracking object.

Then, at a step S207, in order to position the estimated region of tracking object within an angle of view of the camera 200, control signals are generated and output from the camera control signal output interface 140 to the controller 210. In accordance with those control signals, the camera 200 is controlled to pan, tilt, and zoom to thereby track the tracking object. As the camera 200 has changed imaging conditions such as a view angle, the tracking object in a taken image has relative displacements or movements corresponding to such changes, which will be taken into account when processing subsequent image frames. More specifically, locations of the particles are controlled to keep their positional relationships relative to the tracking object. This may be implemented in a conventional manner.

Then, at a step S208, thus measured likelihoods of particles are based on to move low-likelihood particles to locations where they will have increased likelihoods, so that the proportion (as the probability of presence) of high-likelihood particles will be increased. As a result, as in FIG. 4E, particles are aggregated on the tracking object.

Then, at a step S209, it is determined if the target tracking process S104 is completed. If it is complete, the target tracking process goes to an end. Unless it is complete, the control flow again goes to the step S202. This means re-spreading a set of particles aggregated on the tracking object, for repeating a series of above-noted processes on a subsequent image frame, till completion of the target tracking process. The completion of target tracking process may be determined on a criterion, such as that including the tracking object having gone out of a tracking range of the camera 200, or by a completion command from operator.

On the other hand, at the step S205, unless it is determined that high-likelihood particles are sufficiently present (No at the step S205), then the tracking object might have significantly changed apparent colors, so keeping the tracking using a current target color might undergo a reduced accuracy in target tracking. Accordingly, the control flow goes to a step S210 to execute a target color update process.

The target color update process is a characteristic process in this embodiment, as will be described below. This process is executed when the proportion of high-likelihood particles has become insufficient, as likelihoods of the spread particles are measured with respect to a target color set up in the target color storer 132. In the target color update process, likelihoods of the spread particles are measured with respect to a difference in luminance between anterior and posterior image frames, checking for a significant moved region between the frames. Then, if found any, the moved region is assumed by inference as a current position of the tracking object, and has a color therein taken to set as a new target color, to thereby update the target color storer 132. This is to be followed by a restarted target tracking using the new target color for measurements of likelihoods thereto at respective locations of re-spread particles.

It is noted that this embodiment makes measurements of likelihoods with respect to luminance difference, without changing locations of particles, i.e., as they are left as having been spread. This allows for a facilitated recognition of a tracking object consecutive in movement.

Description is now made of control actions for the target color update process, with reference to a flowchart thereof in FIG. 5. In this embodiment, as a result of a set of measurements (at the step S204 in FIG. 3) of likelihoods to a target color that has been set up to enter the target tracking process at the step S104 in FIG. 2, if the proportion of high-likelihood particles has become insufficient (No at the step S205 in FIG. 3), the control flow goes to the step S210 to implement the target color update process shown in FIG. 5. In this process, first, at a step S301, the camera control signal output interface 140 is operated to output maintained control signals, to keep imaging conditions such as pan, tilt, and zoom of the camera 200 from being varied, so cameral control is suspended to hold a current view angle.

After the suspension, at a step S302, a first image frame is input and stored by the image storer 131. Then, at a step S303, a second image frame is input and stored by the image storer 131. In addition, at a step S304, a third image frame is input and stored by the image storer 131. The second image frame to the first image frame, as well as the third image frame to the second image frame, can do simply with a posterior-to-anterior relationship in the time direction, and may be a consecutive image frame or an image frame after an interval of one or more frames, whichever is selective in accordance with a moving speed of tracking object, or performance of computer resources such as CPU in use.

This example employs three image frames mutually consecutive along the time axis. It is noted that, at this stage, the three consecutive image frames are stored as the first to third image frames in the image storer 131.

Figure 6A:
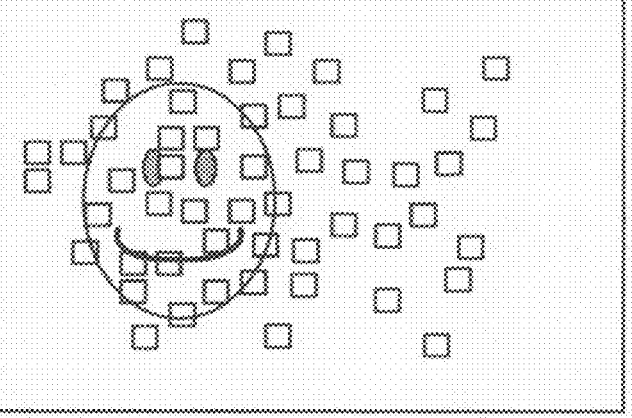
FIGS. 6A to 6C are illustrations of first to third image frames input in the target color update process according to the first embodiment, respectively.
Figure 6B:
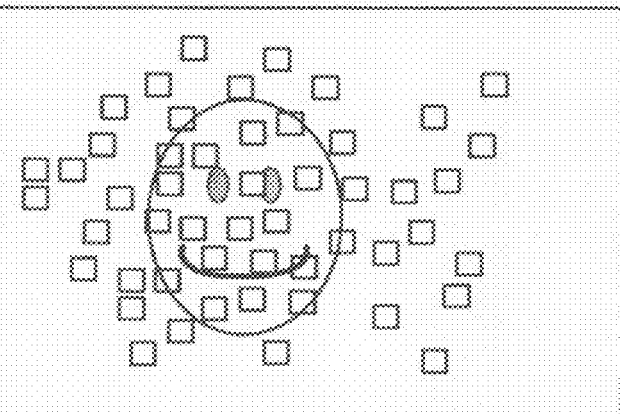
Figure 6C:
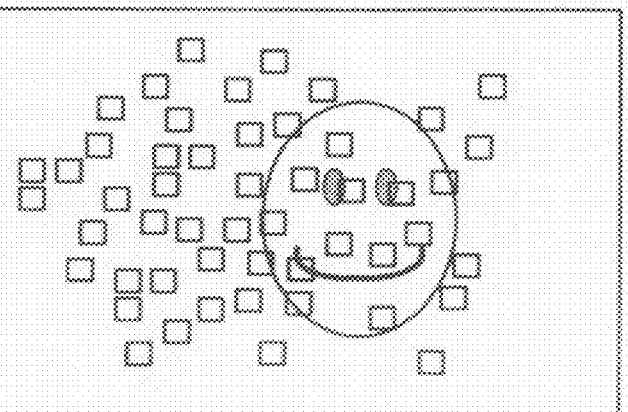

FIGS. 6A, 6B, and 6C illustrate the first, second, and third image frames, respectively. Those figures show a face of person moving from the left to the right. They each indicate a set of particles arranged at locations identical to particles spread before entering the target color update process in the target tracking process. Those particles are each held at an identical location in the first to third image frames.

Next, at a step S305, the particle filter processor 130 measures likelihoods with respect to luminance differences between consecutive image frames, employing the above-noted three image frames. First, as illustrated in FIG. 7A, the processor 130 superimposes the first image frame with the spread particles thereon inclusive on the second image frame with the spread particles thereon inclusive, by mapping them onto an imaginary first common frame, and measures a likelihood Y1 at each particle thereon, with respect to luminance difference between pixel regions of the first and second image frames as mapped within a vicinity of the particle. More specifically, the processor 130 is adapted to work within a vicinity (e.g., a rectangular region) about each particle on the first common frame: to measure the number of pixels residing therein, together with luminance of a respective pixel mapped from the first image frame, and luminance of a corresponding pixel mapped from the second image frame; and calculate a proportion in number of pixels relatively large in difference of luminance between the first image frame and the second image frame, to provide as a likelihood Y1 of the particle. For particles in regions where the second image frame is changed from the first image frame, their likelihoods Y1 will thus be increased. FIG. 7A indicates dark-colored particles as high-Y1 likelihood particles.

Likewise, as illustrated in FIG. 7B, the particle filter processor 130 is adapted to perform measurements as necessary for calculation of likelihood Y2 of each particle, with respect to luminance difference between the second image frame and the third image frame, as they are mapped onto an imaginary second common frame. FIG. 7B indicates dark-colored particles as high-Y2 likelihood particles.

Then, as illustrated in FIG. 8, the particle filter processor 130 is adapted to map the first common frame and the second common frame onto an imaginary third common frame, for an AND operation between a value of likelihood Y1 and a value of likelihood Y2 of each particle thereon, to determine likelihoods YD of particles on the third common frame. For particles in regions having undergone any movement among the first to third image frames, their likelihoods YD will thus be increased. Accordingly, the tracking object may well be estimated as residing in a region including high-YD likelihood particles. FIG. 8 indicates dark-colored particles as high-YD likelihood particles.

There may be small changes as movements between image frames, with resultant reduction in likelihood of particles with respect to luminance difference, so high-likelihood particles will not be sufficient in proportion. To this point, at a step S306, the particle filter processor 130 is adapted to check for a sufficient presence of high-likelihood particles. The determination on whether or not high-likelihood particles are sufficiently present may depend on a criterion of 20% or more to be ensured in proportion of particles having likelihoods equal to or higher than a prescribed reference likelihood, to determine a sufficient presence of high-likelihood particles. The reference likelihood as well as a reference proportion may be adequately set up as necessary.

If particles being high in likelihood based on luminance difference are sufficiently present (Yes at the step S306), the control flow goes to a step S307 to refer to the third common frame, for preparation of color-component histograms of high-YD likelihoods, to evaluate frequencies of colors. Then, at a step S308, the most frequent color is estimated as a current color of the tracking object, to thereby update the target color storer 132. Thereafter, the control flow again goes to the target tracking process, for a tracking using likelihoods of particles with respect to the updated target color.

On the other hand, if the proportion of particles being high in likelihood by luminance difference is insufficient (No at the step S306), the tracking object might have gotten behind some object or gotten still, during an interval from the first image frame to the third image frame. Such a situation is overcome by use of one or more subsequent image frames for detection of a motion, as follows.

First, at a step S309, particles being relatively high in likelihood are referenced to move other particles near them. Then, at a step S310, that image frame which has been stored as the second is slid to a first, and that image frame which has been stored as the third is slid to a second. That is, the stored first image frame is updated by the stored second image frame, and the stored second image frame is updated by the stored third image frame. Then, the control flow again goes to the step S304, where a new image frame is input to thereby update the stored third image frame.

Then, at the step S305, the updated first, second, and third image frames are employed to again perform measurements of likelihoods with respect to luminance difference. The steps S304 to S306, S309, and S310 will be repeated till the proportion of high-likelihood particles gets high enough for detection of a motion to identify the tracking object, permitting a color thereof to be taken to thereby update target color.

This allows for an enhanced tracking accuracy, even when the tracking object has changed apparent colors due to a varied white balance by a change of light source, ambient environmental change, luminance variation by a change in exposure, etc. In particular, such as when an object to be imaged has a suddenly changed brightness, constituting a difficulty of tracking by a current target color, the present embodiment enables the target color to be updated by a current apparent color of the tracking object, allowing for a maintained tracking.

In the embodiment described, the target tracker 100 is configured with the tracking object designation acceptor 150 for accepting designation of a tracking object in an image frame displayed on the display 120. However, the target tracker 100 includes an unshown tracking controller for motion detection, color detection, etc, and may be adapted to use a result of such detection for automatic designation of a tracking object or its position. In such a case, the tracking object designation acceptor 150 may be omitted or removed from the display 120 or else. Further, in the target tracker 100, to define a tracking object at a start of tacking, the manual designation may be substituted by use of the target color updator 133 for responding to a motion of any object by setting a target color, to implement a configuration for starting a tracking process of setting a moving object as a tracking object in an automatic manner.

(Second Embodiment)

Figure 9:
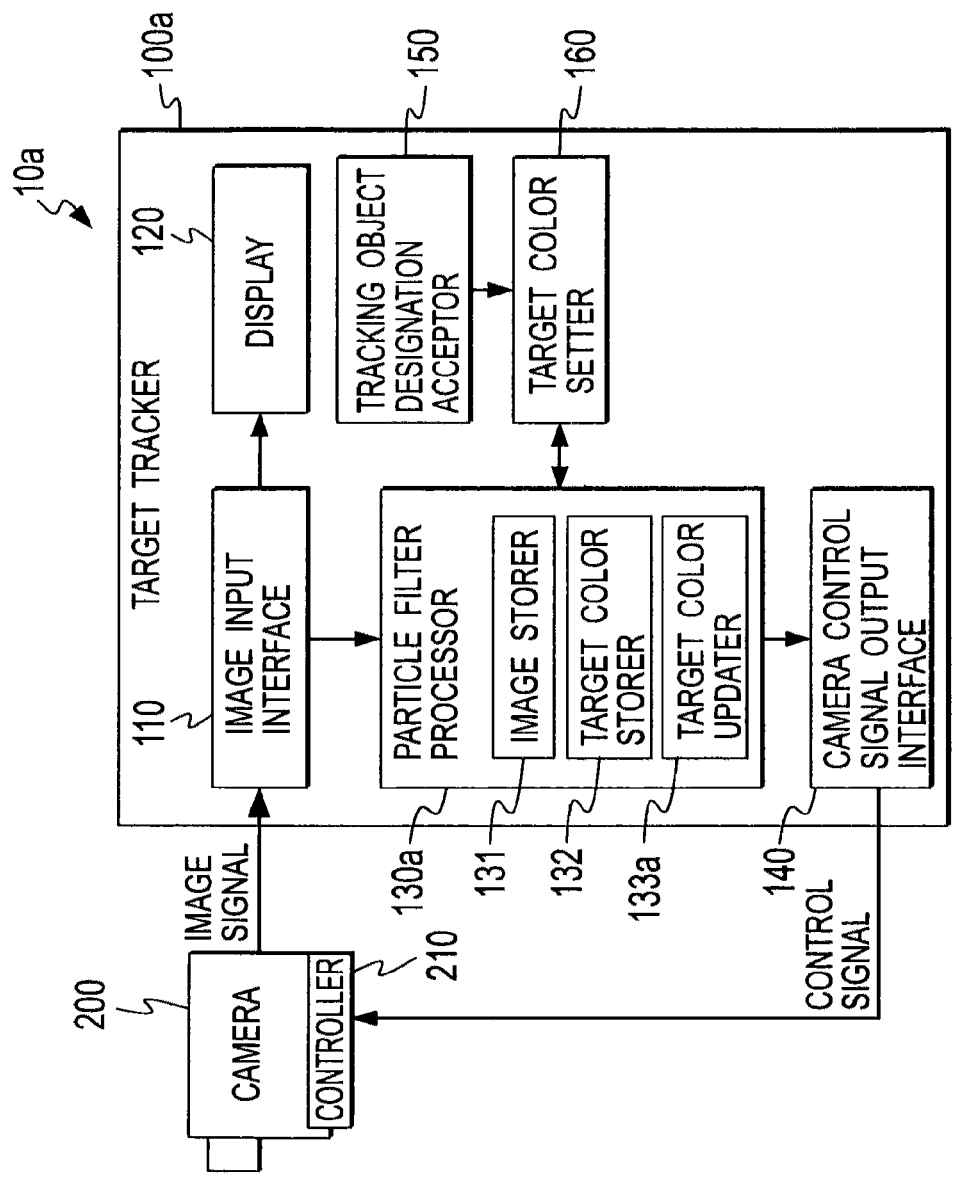
FIG. 9 is a block diagram of configuration of a target tracking system including a target tracker according to a second embodiment of the present invention.

Description is now made of a second embodiment of the present invention. FIG. 9 is a block diagram of configuration of a target tracking system 10*a* including a target tracker 100*a* according to the second embodiment. As illustrated in the figure, the target tracking system 10*a* includes: the target tracker 100*a*; a camera 200 configured for picking up an angle of view to output signals of a frame of image; and a controller 210 adapted to implement pan and tilt control and zoom factor control of the camera 200 in accordance with control signals from the target tracker 100*a*.

The camera 200 as well as the controller 210 may well be identical in configuration to the first embodiment. The target tracker 100*a* may be substantially identical in configuration to the target tracker 100 in the first embodiment. Accordingly, like components and elements are designated by like reference characters, omitting redundancy.

The target tracker 100*a* includes: an image input interface 110 configured to input image signals output from the camera 200; a display 120 configured to display a picture based on a frame of input signals; a particle filter processor 130*a* configured for a process of tracking a target object by use of a particle filter, a camera control signal output interface 140 configured for responding to a result of the tracking by generating a set of control signals for controlling the camera 200, to output to the controller 210; a tracking object designation acceptor 150 configured for acceptance of an object to be tracked in a frame of image displayed on the display 120; and a target color setter 160 configured to set up a target color in correspondence to a designated tracking object.

The particle filter processor 130*a* includes: an image storer 131 adapted for storage of three frames of image data to be processed in the process of tracking a target object by use of a particle filter, a target color storer 132 adapted for storage of a target color as set up; and a target color updator 133*a* adapted, as the tracking object has an apparent color changed so the tracking by the set color is difficult, to estimate a current position of the tracking object based on luminance differences between image frames having a temporal difference, for acquisition of a color from the region to thereby update the target color.

According to the second embodiment, the target tracker 100*a* is configured to follow a sequence of processes similar to that illustrated in FIG. 2 for the target tracker 100 in the first embodiment. In other words, the target tracker 100*a* is adapted: at a step S101, to have image signals input thereto from the camera 200 by the frame as a unit; and at a step S102, to display image signals, waiting for designation of a tracking object. After acceptance of designation of a tracking object (Yes at the step S102), the control flow goes to a step S103 to set up a target color, and to a step S104 to implement a target tracking process.

According to the second embodiment, the target tracking process is implemented as a sequence of subsidiary processes similar to that illustrated in FIG. 3 for the target tracking process in the first embodiment. In other words, the particle filter processor 130*a* is adapted: at a step S201, to generate particles within a vicinity of a region designated as a tracking object; and at a step S202, to move them to spread in accordance with a prescribed rule. Then, at a step S203, the next frame of image is input, and at a step S204, likelihoods of particles are measured. Next, at a step S205, it is determined whether or not high-likelihood particles are sufficiently present, for a secured accuracy of the target tracking using a target color. If it is determined that high-likelihood particles are sufficiently present (Yes at the step S205), then the control flow goes to a step S206 to estimate a region of the tracking object. Then, at a step S207, control signals are output, to position the estimated region of tracking object within an angle of view of the camera 200. Afterwards, at a step S208, particles are aggregated for the target tracking process to be continued.

On the other hand, unless it is determined that high-likelihood particles are sufficiently present (No at the step S205), then the control flow goes to a step S210 to execute a target color update process.

The target color update process is a characteristic process in the second embodiment, as will be described below. In the second embodiment also, this process is executed when the proportion of high-likelihood particles has become insufficient, as likelihoods of the spread particles are measured with respect to a target color set up in the target color storer 132. In the target color update process, likelihoods of the spread particles are measured with respect to a difference in luminance between anterior and posterior image frames, checking for a significant moved region between the frames. Then, if found any, the moved region is assumed by inference as a current position of the tracking object, and has a color therein taken to set as a new target color, to thereby update the target color storer 132. This is to be followed by a restarted target tracking using the new target color for measurements of likelihoods thereto at respective locations of re-spread particles.

It is noted that the second embodiment makes measurements of likelihoods with respect to luminance difference, by spreading particles to rearrange in image frames. This allows for a facilitated recognition of a tracking object, such as that having gotten behind some object and appearing somewhere else, for instance.

FIG. 10 shows a flowchart of control actions for the target color update process according to the second embodiment. In this embodiment also, as a result of a set of measurements (at the step S204 in FIG. 3) of likelihoods to a target color that has been set up to enter the target tracking process at the step S104 in FIG. 2, if the proportion of high-likelihood particles has become insufficient (No at the step S205 in FIG. 3), the control flow goes to the step S210 to implement the target color update process shown in FIG. 10. In this process, first, at a step S401, the camera control signal output interface 140 is operated to output maintained control signals, to keep imaging conditions such as pan, tilt, and zoom of the camera 200 from being varied, so cameral control is suspended to hold a current view angle.

In the first embodiment, particles are left as they are once spread (at the step S202) for measurements (at the step S305)

of likelihoods with respect to luminance difference. Instead, in the second embodiment, at a step S402, the spread particles are re-spread in an image frame being displayed. There may be an arbitrary spread pattern employed for the re-spreading of particles.

Figure 11A:
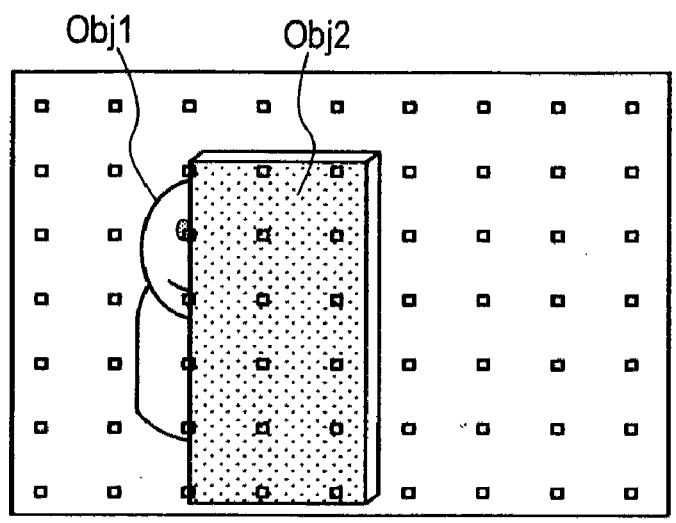
FIGS. 11A to 11C are illustrations of spreading particles in the target color update process according to the second embodiment.
Figure 11B:
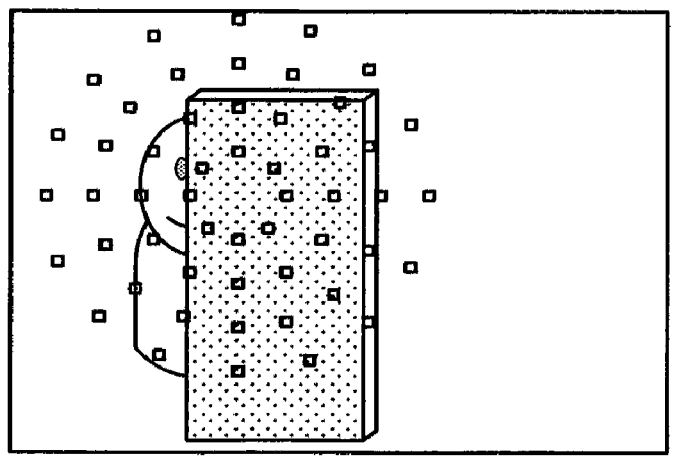
Figure 11C:
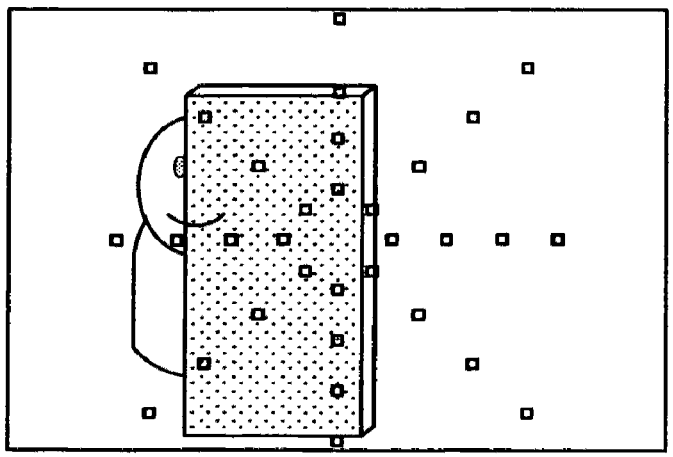

For instance, as illustrated in FIG. 11A, particles may be evenly re-spread over an entire region of the image frame displayed. In this figure, the image frame shows a tracking object Obj1 getting behind a masking object Obj2, thus constituting a difficulty in the tracking using a target color. Or alternatively, as illustrated in FIG. 11B, a system of spread particles may be re-spread on concentric circles about a gravity center thereof, or about a geometrical center of the image frame. Or else, as illustrated in FIG. 11C, particles may be re-spread regularly in a radial fashion. Or otherwise, the particle spreading algorithm in the process at the step S202 may be applied, while multiplying spread distances, to re-spread particles randomly. In this application, the multiplication may be by a factor of unity, thus assuming particles left as once spread as being re-spread. Or still otherwise, to cope with a tracking object Obj1 getting out of an image frame, particles may be evenly re-spread simply on a side of the frame.

Afterward, like the first embodiment, the control flow goes: to a step S403, to input a first image frame after the control suspension (at the step S401), to store in the image storer 131; then to a step S404, to input a second image frame, to store in the image storer 131; and further to a step S405, to input a third image frame, to store in the image storer 131.

Next, at a step S406, the particle filter processor 130a employs the above-noted three image frames to measure likelihoods with respect to luminance difference between consecutive image frames. Then, at a step S407, it determines whether or not particles being high in likelihood with respect to luminance difference are sufficiently present.

If particles being high in likelihood based on luminance difference are sufficiently present (Yes at the step S407), the control flow goes to a step S408 to refer to a third common frame, for preparation of color-component histograms of high-YD likelihoods, to evaluate frequencies of colors.

Figure 12:
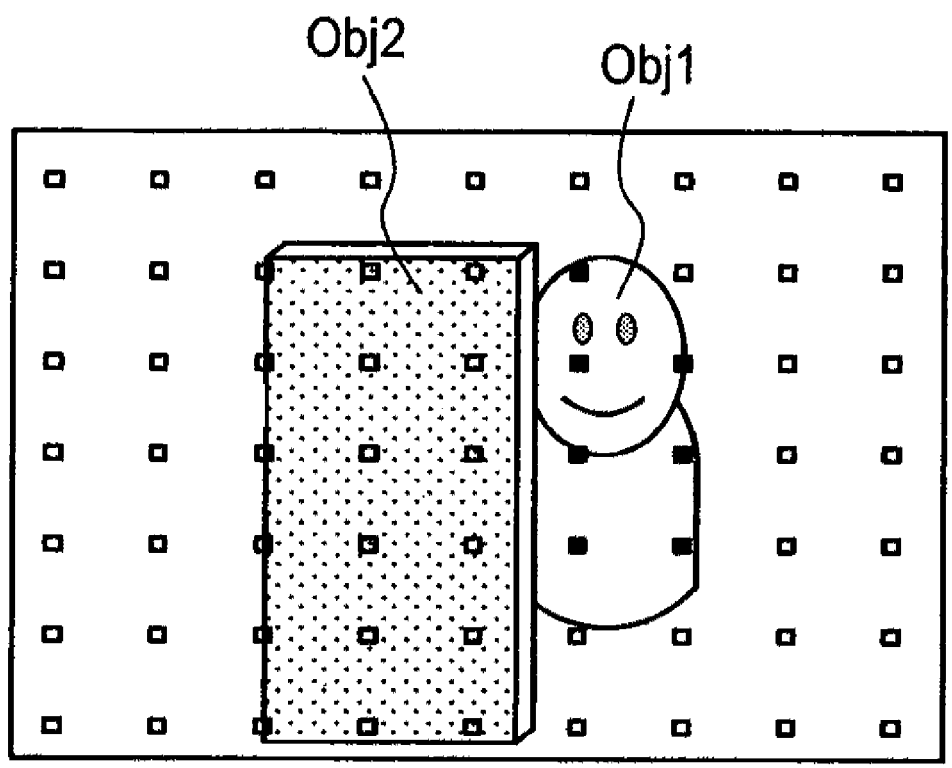
FIG. 12 is an illustration of a tracking object appearing at an opposite side of a shielding in the target color update process according to the second embodiment.

FIG. 12 shows the tracking object Obj1 coming out at an opposite side of the masking object Obj2. In this case, there is a region defining the tracking object Obj1, where movements are detective with high likelihoods based on luminance difference. There are black-colored particles representing high likelihoods.

Then, at a step S409, the most frequent color is estimated as a current color of the tracking object, to thereby update the target color storer 132. Thereafter, the control flow again goes to the target tracking process, for a tracking using likelihoods of particles with respect to the updated target color.

On the other hand, if the proportion of particles being high in likelihood by luminance difference is insufficient (No at the step S407), the control flow goes to a step S410, where particles being relatively high in likelihood are referenced to move other particles near them. Then, at a step S411, that image frame which has been stored as a second is slid to a first, and that image frame which has been stored as a third is slid to a second. That is, a stored first image frame is updated by the stored second image frame, and the stored second image frame is updated by the stored third image frame. Then, the control flow again goes to the step S405, where a new image frame is input to thereby update the stored third image frame.

Then, at the step S406, the updated first, second, and third image frames are employed to again perform measurements of likelihoods with respect to luminance difference. The steps S405 to 5407, S410, and S411 will be repeated till the proportion of high-likelihood particles gets high enough for detection of a motion to identify the tracking object, permitting a color thereof to be taken to thereby update target color.

Such being the case, according to the second embodiment, even when a tracking object exhibits such movements as involving getting behind some object and again appearing, to an extent constituting a difficulty of tracking by a current target color, the target tracker permits the target color to be automatically updated by a current apparent color of the tracking object, thus allowing for a maintained tracking with an enhanced accuracy.

(Third Embodiment)

Figure 13:
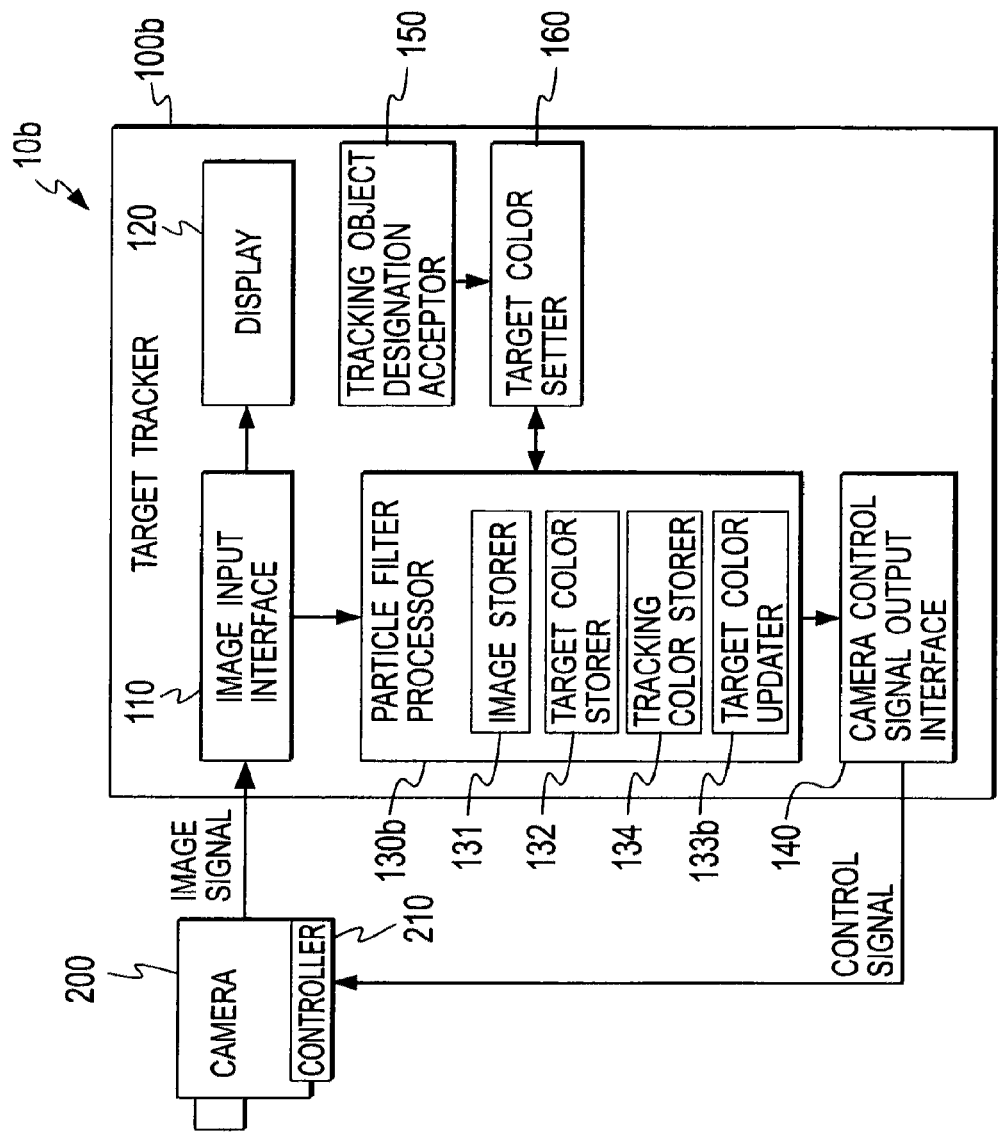
FIG. 13 is a block diagram of configuration of a target tracking system including a target tracker according to a third embodiment of the present invention.

Description is now made of a third embodiment of the present invention. FIG. 13 is a block diagram of configuration of a target tracking system 10b including a target tracker 100b according to the third embodiment. As illustrated in the figure, the target tracking system 10b includes: the target tracker 100b; a camera 200 configured for picking up an angle of view to output signals of a frame of image; and a controller 210 adapted to implement pan and tilt control and zoom factor control of the camera 200 in accordance with control signals from the target tracker 100b.

The camera 200 as well as the controller 210 may well be identical in configuration to the first embodiment. The target tracker 100b may be substantially identical in configuration to the target tracker 100 in the first embodiment. Accordingly, like components and elements are designated by like reference characters, omitting redundancy.

The target tracker 100b includes: an image input interface 110 configured to input image signals output from the camera 200; a display 120 configured to display a picture based on a frame of input signals; a particle filter processor 130b configured for a process of tracking a target object by use of a particle filter, a camera control signal output interface 140 configured for responding to a result of the tracking by generating a set of control signals for controlling the camera 200, to output to the controller 210; a tracking object designation acceptor 150 configured for acceptance of an object to be tracked in a frame of image displayed on the display 120; and a target color setter 160 configured to set up a target color in correspondence to a designated tracking object.

The particle filter processor 130b includes: an image storer 131 adapted for storage of three frames of image data to be processed in the process of tracking a target object by use of a particle filter; a target color storer 132 adapted for storage of a target color as set up; a target color updator 133b adapted, as the tracking object has an apparent color changed so the tracking by the set color is difficult, to estimate a current position of the tracking object based on luminance differences between image frames having a temporal difference, for acquisition of a color from the region to thereby update the target color; and a tracking color storer 134 adapted for storage of a latest color data of the tracking object.

According to the third embodiment, the target tracker 100b is configured to follow a sequence of processes similar to that illustrated in FIG. 2 for the target tracker 100 in the first embodiment. In other words, the target tracker 100b is adapted: at a step S101, to have image signals input thereto from the camera 200 by the frame as a unit and at a step S102, to display image signals, waiting for designation of a tracking object. After acceptance of designation of a tracking object (Yes at the step S102), the control flow goes to a step S103 to set up a target color, and to a step S104 to implement a target tracking process.

According to the third embodiment, the target tracking process (S104) includes, in a tracking using a target color, employing: a system of particles re-spread over an entirety of image frame like the second embodiment, such as when an object of the tracking has gotten behind a masking object, constituting a difficulty of the tracking using the target color, and a set of likelihoods weighted, not simply by use of luminance differences, but also by a latest data on a certain color or colors for the target-color tracking, to determine a specific color to thereby update the target color.

Figure 14:
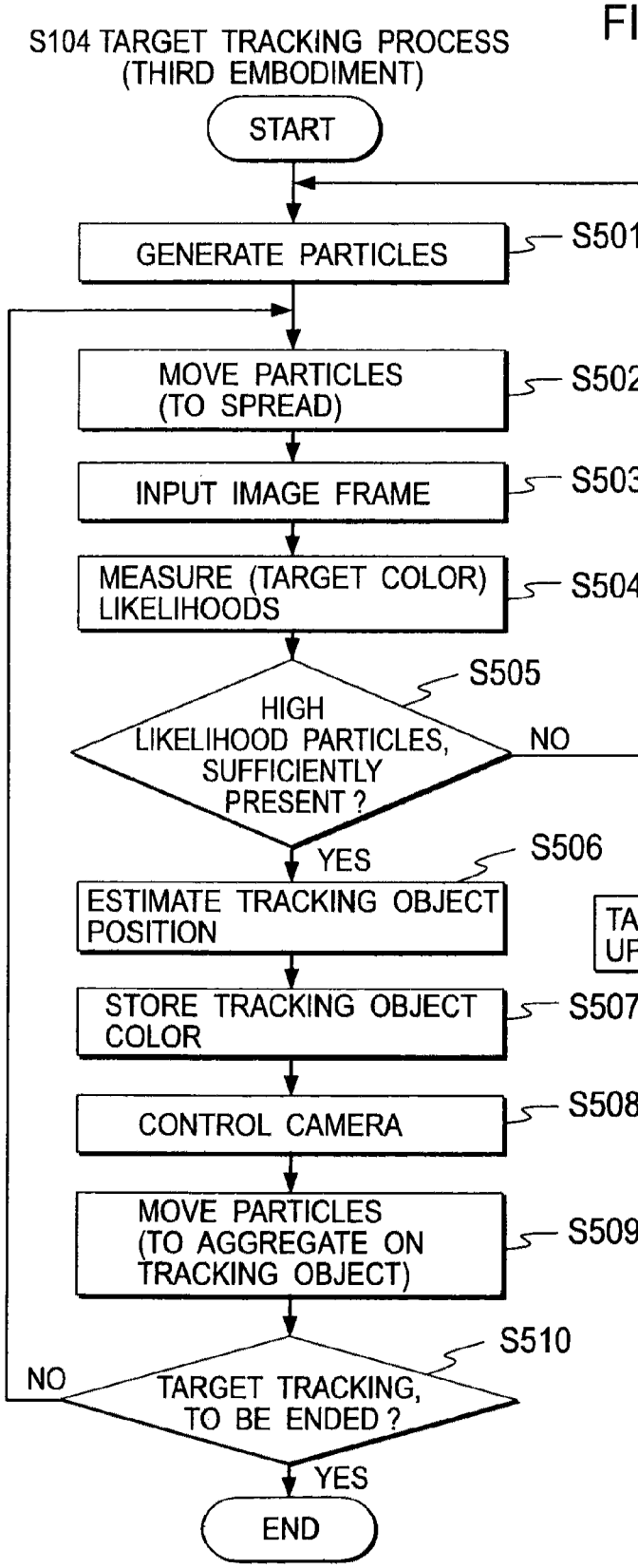
FIG. 14 is a flowchart of control actions of a target tracking process of the target tracker according to the third embodiment.

Description is now made of the target tracking process according to the third embodiment, with reference to a flowchart in FIG. 14. That is, like the first embodiment the particle filter processor 130b is adapted: at a step S501, to generate particles within a vicinity of a region designated as a tracking object; and at a step S502, to move them to spread in accordance with a prescribed rule. Then, at a step S503, the next frame of image is input, and at a step S504, likelihoods of particles are measured. Next, at a step S505, it is determined whether or not high-likelihood particles are sufficiently present, for a secured accuracy of the target tracking using a target color. If it is determined that high-likelihood particles are sufficiently present (Yes at the step S505), then the control flow goes to a step S506 to estimate a region where the tracking object should be positioned.

After that, the third embodiment includes, at a step S507, preparing histograms of colors of high-likelihood particles, having a most frequent color taken to store in the target color storer 134. Accordingly, the tracking color storer 134 has a stored color updated every execution of a particle filtering process. That is, it has stored therein a latest data on a color of the tracking object.

Then, at a step S508, control signals are output, to position the estimated region of tracking object within an angle of view of the camera 200. Afterwards, at a step S509, particles are aggregated for the target tracking process to be continued.

On the other hand, unless it is determined that high-likelihood particles are sufficiently present (No at the step S505), then the control flow goes to a step S511 to execute a target color update process.

The target color update process is a characteristic process in the third embodiment, as will be described below. In the third embodiment also, this process is executed when the proportion of high-likelihood particles has become insufficient, as likelihoods of the spread particles are measured with respect to a target color set up in the target color storer 132. In the target color update process, likelihoods of the spread particles are measured with respect to a difference in luminance between anterior and posterior image frames, checking for a significant moved region between the frames. Then, if found any, the moved region is assumed by inference as a current position of the tracking object, and has one of colors acquired therefrom selected to set as a new target color, to thereby update the target color storer 132. The new target color is selected on bases of the current target color and a latest color data of the tracking object. That is, the new target color is selected, from among those colors directly acquired at pixels in the moved region, as a color nearest in a comparative measure of distance to the target color or the latest color data of the tracking object. The target tracking can thus have the more enhanced accuracy. This is to be followed by a restarted target tracking using the new target color for measurements of likelihoods thereto at respective locations of re-spread particles.

It is noted that like the second embodiment, the third embodiment also makes measurements of likelihoods with respect to luminance difference, by spreading particles to rearrange in image frames. This allows for a facilitated recognition of a tracking object, such as that having gotten behind some object and appearing somewhere else, for instance.

Figure 15:
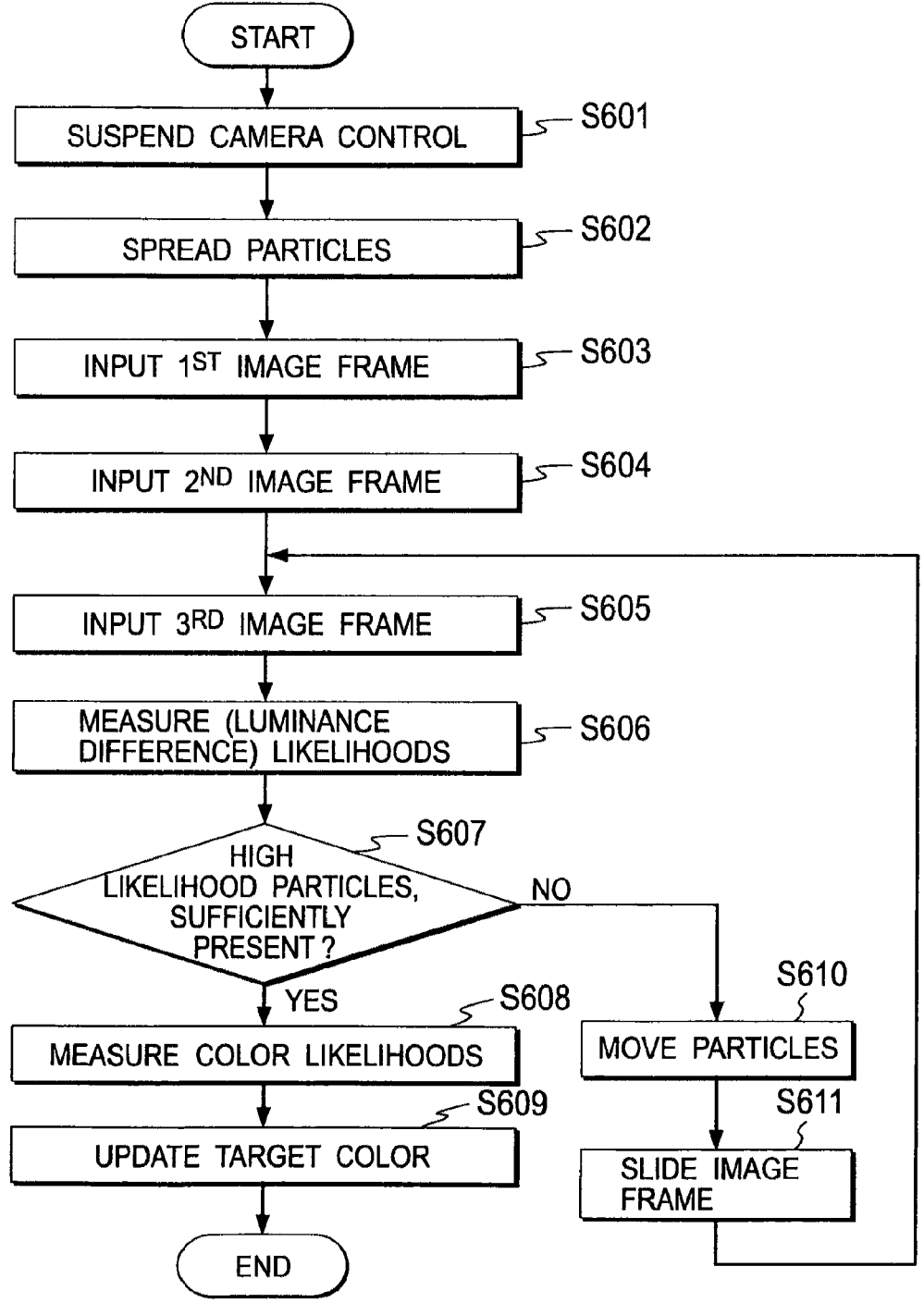
FIG. 15 is a flowchart of control actions of a target color update process in the target tracking process according to the third embodiment.

FIG. 15 shows a flowchart of control actions for the target color update process according to the third embodiment. In this embodiment also, as a result of a set of measurements (at the step S504 in FIG. 14) of likelihoods to a target color that has been set up to enter the target tracking process at the step S104 in FIG. 2, if the proportion of high-likelihood particles has become insufficient (No at the step S505 in FIG. 14), the control flow goes to the step S511 to implement the target color update process shown in FIG. 15. In this process, first, at a step S601, the camera control signal output interface 140 is operated to output maintained control signals, to keep imaging conditions such as pan, tilt, and zoom of the camera 200 from being varied, so cameral control is suspended to hold a current view angle.

In the third embodiment, like the second embodiment, at a step S602, particles as having been spread (at the step S502) are re-spread in an image frame being displayed. There may be an arbitrary spread pattern employed for the re-spreading of particles. Then, the control flow goes: to a step S603, to input a first image frame after the control suspension (at the step S601), to store in the image storer 131; then to a step S604, to input a second image frame, to store in the image storer 131; and further to a step S605, to input a third image frame, to store in the image storer 131.

Next, at a step S406, the particle filter processor 130b employs the above-noted three image frames to measure likelihoods with respect to luminance difference between consecutive image frames. Then, at a step S607, it determines whether or not particles being high in likelihood with respect to luminance difference are sufficiently present.

If particles being high in likelihood based on luminance difference are sufficiently present (Yes at the step S607), the control flow goes to a step S608 for measurements of likelihoods of the high-likelihood particles based on a combination of a current target color stored in the target color storer 132, a latest color data of the tracking object as stored in the tracking color storer 134, and a set of color data of pixels.

Figure 16A:
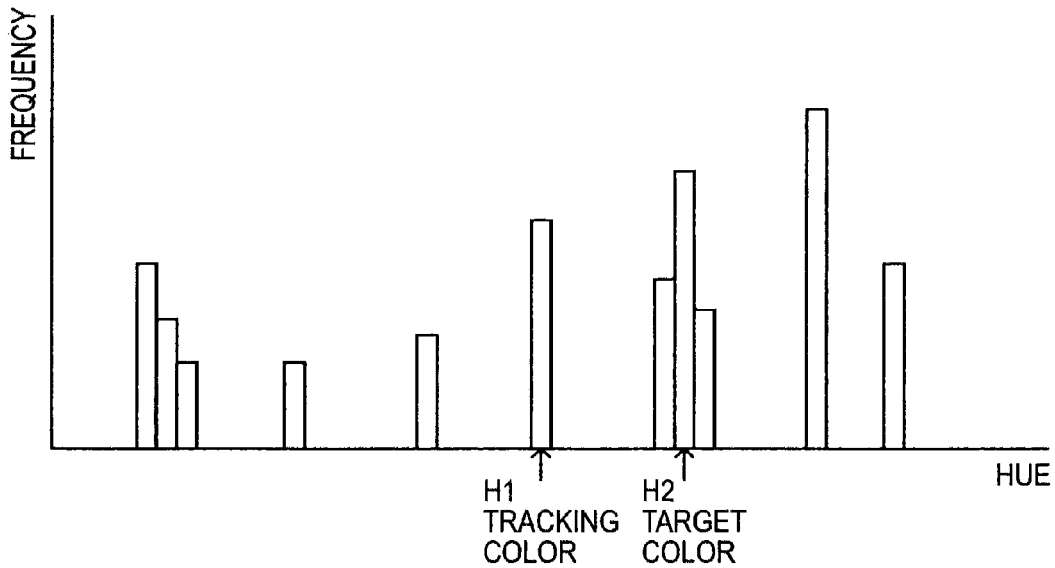
FIGS. 16A and 16B are histograms illustrating how to use color information for measurement of likelihoods in the target color update process according to the third embodiment.

Description is now made of a method of using color data for the measurements of likelihoods. Those particles having high likelihoods have their color data including hues (H), which are employed to prepare a graph of histograms, such as that illustrated in FIG. 16A, where the axis of abscissa represents a hue (H), and the axis of ordinate, a frequency. Designated at H1 is a hue in the color data stored in the tracking color storer 134, and H2, a hue of the target color stored in the target color storer 132.

Figure 16B:
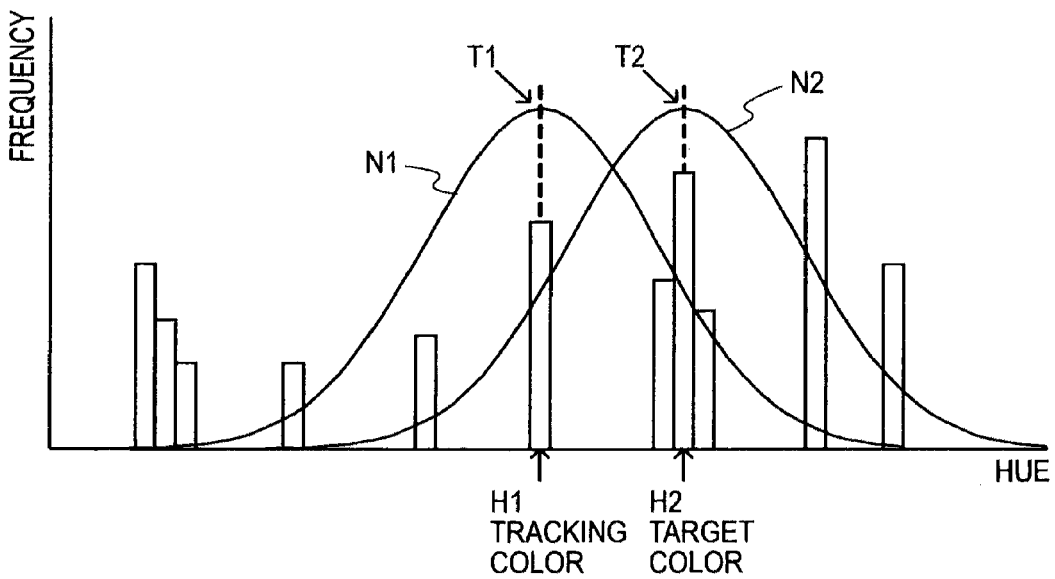

Then, as illustrated in FIG. 16B, there are plotted curves N1 and N2 representing normal distributions that have the hues H1 and H2 as $\mu$'s (means) thereof, respectively. In the figure, the curve N1 has a peak T1, and the curve N2, a peak T2.

The normal distribution curve is a curve uniquely defined in shape by two parameters being $\mu$ (mean) and $\sigma^2$ (standard deviation). For the normal distributions curves N1 and N2 to be determined, the $\mu$'s (means) are fixed as H1 and H2, respectively, while each $\sigma^2$ (standard deviation) is arbitrarily selective. Of the shape, the larger the $\sigma^2$ (standard deviation) is, the larger the horizontal spread becomes, and the lower the height of peak becomes. To the contrary, the smaller the $\sigma^2$ (standard deviation) is, the smaller the horizontal spread becomes and the larger the height of peak becomes.

Frequency-directional values may be multiplied by a constant for calculation to change the height of normal distribution curve, or there may be addition of a constant value in the frequency direction for provision of an offset to the height of normal distribution curve. Those operations have different effects, as will be described.

Figure 17A:
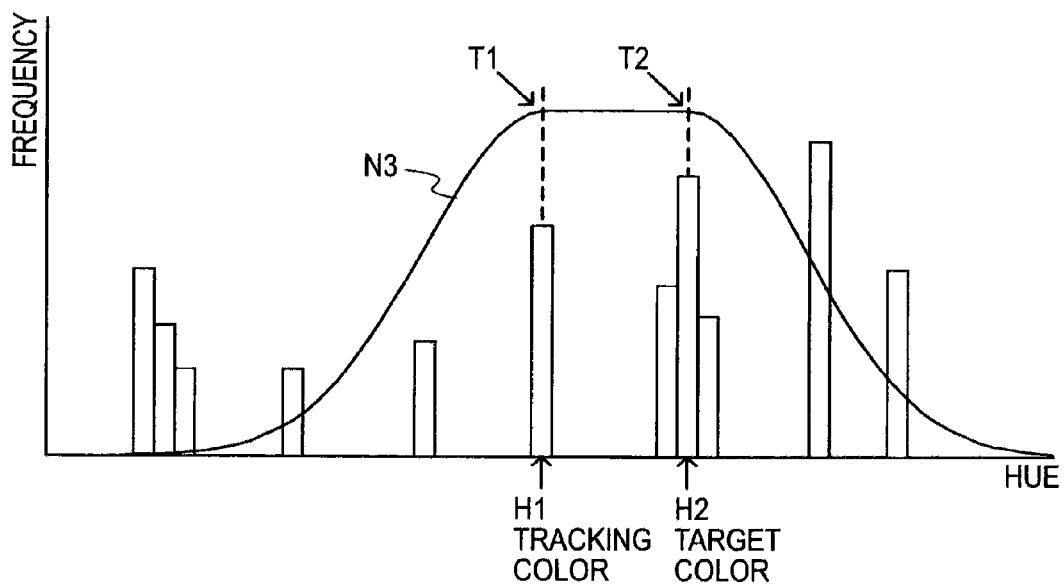
FIGS. 17A and 17B are histograms illustrating how to use color information for measurement of likelihoods in the target color update process according to the third embodiment.
Figure 17B:
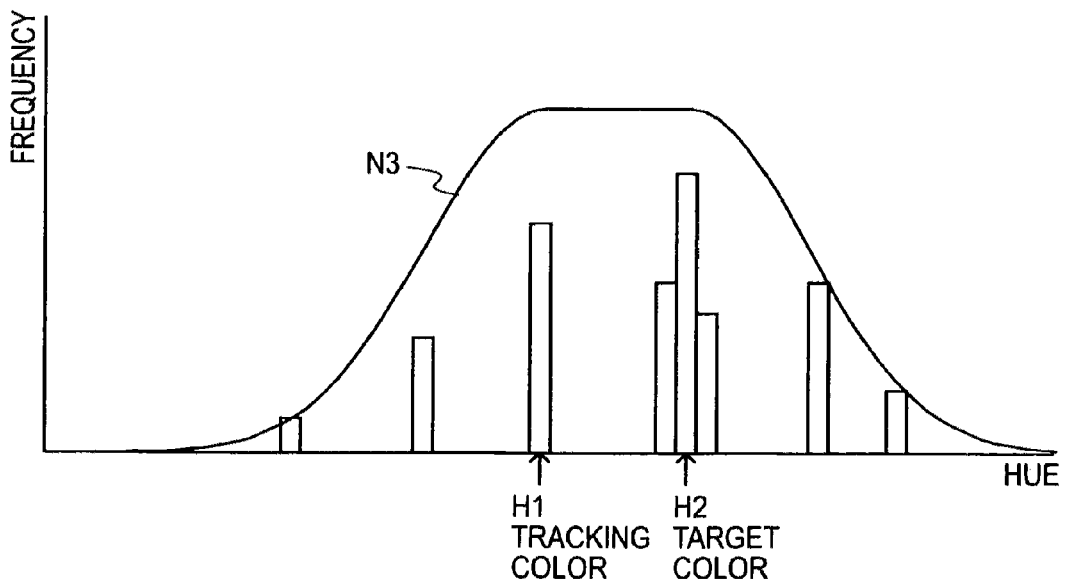

Next, as illustrated in FIG. 17A, the peak T1 of normal distribution curve N1 and the peak T2 of normal distribution curve N2 are interconnected by a line segment T1-T2, to provide an outline curve N3 that envelopes the normal distribution curve N1, the normal distribution curve N2, and the line segment T1-T2. Then, as illustrated in FIG. 17B, those histograms having frequencies exceeding the outline curve N3 have their exceeding portions cut off, so histograms fit under the outline curve N3. This permits those colors distant in hue from the target color or from the tracking object's latest color to be each reduced in evaluation.

Then, at a step S609, the most frequent hue in the histograms in FIG. 17B is estimated as a current color of the tracking object, to thereby update the target color storer 132. Thereafter, the control flow again goes to the target tracking process, for a tracking using likelihoods of particles with respect to the updated target color.

On the other hand, if the proportion of particles being high in likelihood by luminance difference is insufficient (No at the step S607), the control flow goes to a step S610, where particles being relatively high in likelihood are referenced to move other particles near them. Then, at a step S611, that image frame which has been stored as a second is slid to a first, and that image frame which has been stored as a third is slid to a second. That is, a stored first image frame is updated by the stored second image frame, and the stored second image frame is updated by the stored third image frame. Then, the control flow again goes to the step S605, where a new image frame is input to thereby update the stored third image frame.

Then, at the step S606, the updated first, second, and third image frames are employed to again perform measurements of likelihoods with respect to luminance difference. The steps S605 to S607, S610, and S611 will be repeated till the proportion of high-likelihood particles gets high enough for detection of a motion to identify the tracking object, permitting a color thereof to be taken to thereby update target color.

As will be seen from the foregoing description, according to the third embodiment, even when a tracking object exhibits such movements as involving getting behind some object and again appearing, to an extent constituting a difficulty of tracking by a current target color, the target tracker permits the target color to be automatically updated by a current apparent color of the tracking object, thus allowing for a maintained tracking with an enhanced accuracy.

Description is now made of how the tracking performance depends on the shape of normal distribution curve. Of any normal distribution curve, the smaller the $\sigma^2$ (standard deviation) is, the narrower the horizontal spread becomes, as described. This fact is useful, when setting a color highly approximate to a current target color or tracking color, as a new target color. To the contrary, of any normal distribution curve, the larger the $\sigma^2$ (standard deviation) is, the wider the horizontal spread becomes. This permits any color relatively high in degree of approximation to a current target color or tracking color to be set as a new target color, allowing for a relaxed tracking condition, as a merit.

As an affect of an enlarged $\sigma^2$ (standard deviation), the normal distribution curve may have a lowered peak. If left as it is, the normal distribution curve might extend under tops of histograms, even at the peak of the curve. In such a case, vertical coordinates of the normal distribution curve may well be multiplied by a constant for a vertical expansion, or upwardly offset by adding a constant, to provide a normal distribution curve extending over histograms.

(Fourth Embodiment)

Description is now made of a fourth embodiment of the present invention. In the foregoing embodiments, as a result of measurements of likelihoods with respect to a target color, if the proportion of particles being high in likelihood is insufficient, then the reference of likelihoods of particles to be measured is changed to a difference in luminance between anterior and posterior image frames, thereby checking for a region moved between the frames. More specifically, in the first embodiment, particles as once spread are kept from being rearranged, i.e., left as they are located for measurement of likelihoods with respect to luminance difference, while in the second and third embodiments, spread particles are re-spread on an image frame being displayed for measurement of likelihoods with respect to luminance difference.

The former allows for a facilitated recognition of a tracking object, with significance such as when the tracking object makes a continuous motion from a position where it resides. The latter allows for a facilitated recognition of a tracking object, with significance such as when the tracking object as having gotten behind some object comes out from a separate position.

Figure 18:
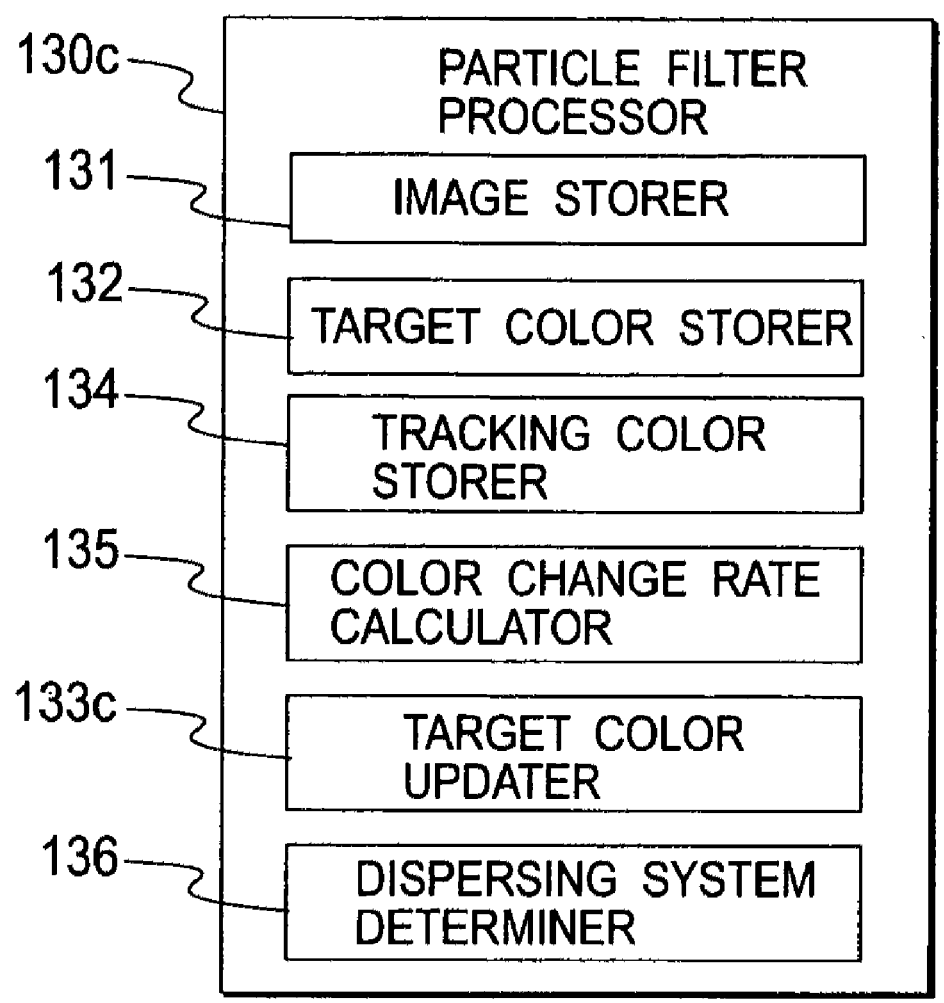
FIG. 18 is a block diagram of configuration of a particle filter processor in a target tracker according to a fourth embodiment of the present invention.

In this respect, the fourth embodiment employs a combination of particle spreading methods either selective as circumstances require. FIG. 18 is a block diagram of configuration of a particle filter processor 130c according to the fourth embodiment. The particle filter processor 130c is applicable to any one of the first to third embodiments.

The particle filter processor 130c includes: an image storer 131 adapted for storage of three frames of image data; a target color storer 132 adapted for storage of a target color as set up; a target color updator 133c; a tracking color storer 134 adapted for storage of a latest color data of a tracking object a color change rate calculator 135 adapted for calculation of a color change rate between the target color stored in the target color storer 132 and the latest color data of the tracking object stored in the tracking color storer 134; and a spread system determiner 136 adapted to determine a particle spread system in accordance with the color change rate.

According to the fourth embodiment, the particle filter processor 130c is adapted for calculation of a color change rate between a target color and a latest color data, to thereby determine whether the cause of a difficulty in the tracking using the target color resides in a sudden change, such as in situation of a tracking object having hidden behind a pillar for instance, or in a gradual change of tracking color. In the former case, it re-spreads particles in an image frame to make measurements of luminance likelihoods. In the latter case, it does not rearrange particles to make measurements of luminance likelihoods.

Figure 19:
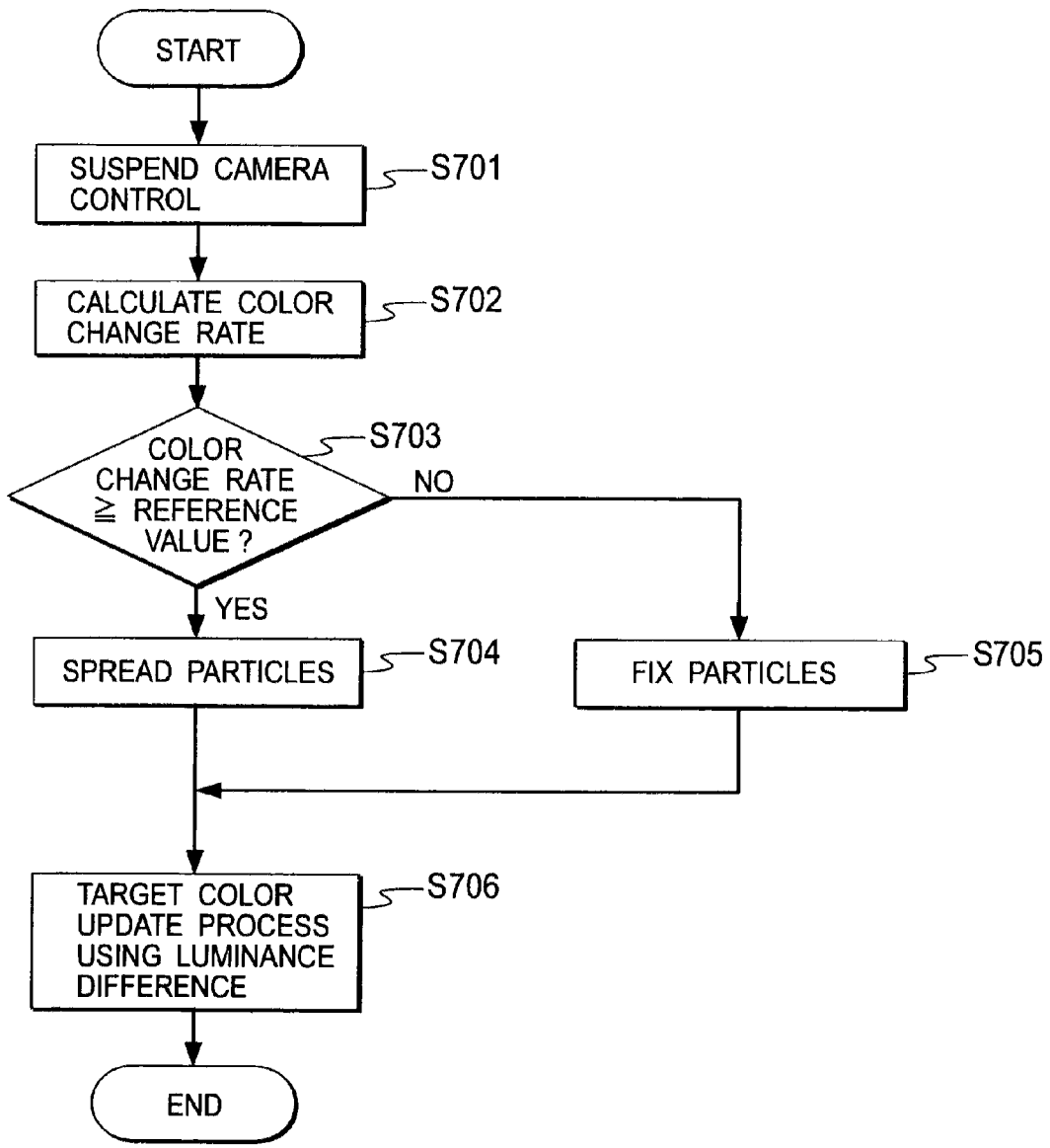
FIG. 19 is a flowchart of control actions of the target tracker according to the fourth embodiment.

FIG. 19 is a flowchart of control actions of the target tracker according to the fourth embodiment. The control actions correspond to those of the target color update process in each of the first to third embodiments. More specifically, the flowchart includes: a camera control suspension process (step S701) corresponding to any one of the camera control suspension processes (step S301 in FIG. 5, step S401 in FIG. 10, step S601 in FIG. 15) in the first to third embodiments; and a target color update process using a luminance difference (step S706) that corresponds to any one of flows of processes including the process of inputting a first image frame (step S302 in FIG. 5, step S402 in FIG. 10, step S602 in FIG. 15) et seq. in the first to third embodiments.

In the fourth embodiment, the control flow goes from the step S701 of camera control suspension to the step S702 for calculation of a color change rate between a target color stored in the target color storer 132 and a latest color data of tracking object stored in the tracking color storer 134.

The color change rate may be calculated as a difference of hue (H) between two associated colors for instance, or as a difference of mean or representative luminance between associated pixel regions apparently dark and light. There may be combination of hue difference and luminance difference both calculated for evaluation of a complex event, such as in a pixel region "having colors changed from reddish ones to brownish ones, as it has become dark".

Then, at a step S703, it is determined whether or not the calculated color change rate is equal to or greater than a prescribed reference value. The reference value is set as a criterion to assume the color change rate as being "a gradual change" as it is smaller than the reference value, and as being "a sudden change" as it is equal to or greater than the reference value. The reference value may be changed as necessary for adaptation to circumstances. There may be provision of a set of reference values to cope with a complex event or series of conditional events.

If the color change rate is equal to or greater than the reference value (Yes at the step S703), that is, if it is "a sudden change", pixels at particles spread on or near the tracking object may have their color data significantly changed, as the tracking object might have hidden behind some object. And, at a step S704, spread particles are re-spread over an image frame being displayed. Then, at a step S706, likelihoods are measured with respect to a reference of likelihood changed to luminance difference, to execute a target color update process.

On the other hand, if the color change rate is smaller than the reference value (No at the step S703), that is, if it is "a gradual change", the tracking target may be extending on or near current locations of spread particles, with involved pixels that might have their color data changed, resulting in decreased likelihoods. And, at a step S705, spread particles are kept from being re-spread, so they are fixed at their locations. Then, at the step S706, likelihoods are measured with respect to the reference of likelihood being changed to luminance difference, to execute the target color update process.

The target color update process (S706) may be identical to that in any one of the first to third embodiments. Such being the case, the fourth embodiment allows for an adequate updated target color to cope with a situation of tracking object assumed by determination to be steep or gentle in change of color data.

While preferred embodiments of the present invention have been described using specific terms, such description is for illustrative purposes, and it is to be understood that changes and variations may be made without departing from the spirit or scope of the following claims.

What is claimed is:

1. A target tracker adapted for a tracking of a target object in a time series of frames of image data, the target tracker comprising:
    a tracking object designation acceptor configured to accept a designation of a tracking object to be the target object in the time series of frames of image data;
    a target color setter configured to set a color for the tracking of the target object in the time series of frames of image data as a target color; and
    a particle filter processor having a set of particles movable in the time series of frames of image data in accordance with a prescribed rule,
    the particle filter processor being configured to apply a first subset of the set of particles to a first frame of image data in the time series of frames of image data, for a first set of measurements to determine a set of color likelihoods by comparison between the target color and colors in vicinities of particles of the first subset of particles in the first frame of image data,
    the particle filter processor being adapted,
        as the set of color likelihoods meets a prescribed criterion, to estimate a first region of the tracking object in the first frame of image data in accordance with the set of color likelihoods, and
        as the set of color likelihoods fails to meet the prescribed criterion, to apply a second subset of the set of particles to one or more frames of image data in the time series of frames of image data, for a second set of measurements to determine a set of luminance likelihoods based on luminance differences between frames of image data in the time series of frames of image data, and estimate a second region of the tracking object in a second frame of image data in the time series of frames of image data in accordance with the set of luminance likelihoods,
    the particle filter processor being configured to update the target color by a color in the first region or the second region, whichever is estimated.

2. The target tracker according to claim 1, wherein the particle filter processor is configured to apply the second subset of particles fixed in position to frames of image data in the time series of frames of image data for the second set of measurements.

3. The target tracker according to claim 1, wherein the particle filter processor is configured to apply the second subset of particles spread to rearrange to a frame of image data in the time series of frames of image data for the second set of measurements.

4. The target tracker according to claim 1, wherein
    the particle filter processor is configured to calculate a color data change rate between a color data of the target color and a color data of a color in the first region or the second region, whichever is estimated, and
    the particle filter processor is configured, as the color data change rate is equal to or greater than a reference value, to apply the second subset of particles spread to rearrange to a frame of image data in the time series of frames of image data for the second set of measurements, and as the color data change rate is smaller than the reference value, to apply the second subset of particles fixed in position to frames of image data in the time series of frames of image data for the second set of measurements.

5. A target tracker adapted for a tracking of a target object in a time series of frames of image data, the target tracker comprising:
    a tracking object designation acceptor configured to accept a designation of a tracking object to be the target object in the time series of frames of image data;
    a target color setter configured to set a color for the tracking of the target object in the time series of frames of image data as a target color;
    a tracking color storer configured to store a latest color for the tracking of the target object in the time series of frames of image data as a tracking color, and
    a particle filter processor having a set of particles movable in the time series of frames of image data in accordance with a prescribed rule,
    the particle filter processor being configured to apply a first subset of the set of particles to a first frame of image data in the time series of frames of image data, for a first set of measurements to determine a set of color likelihoods by comparison between the target color and colors in vicinities of particles of the first subset of particles in the first frame of image data, the particle filter processor being adapted,
- as the set of color likelihoods meets a prescribed criterion, to estimate a first region of the tracking object in the first frame of image data in accordance with the set of color likelihoods, and store a color of the first region as the tracking color in the tracking color storer,
- as the set of color likelihoods fails to meet the prescribed criterion, to apply a second subset of the set of particles to one or more frames of image data in the time series of frames of image data, for a second set of measurements to determine a set of luminance likelihoods based on luminance differences between frames of image data in the time series of frames of image data, and estimate a second region of the tracking object in a second frame of image data in the time series of frames of image data in accordance with the set of luminance likelihoods, the particle filter processor being configured to perform an evaluation of colors involved in the first region or the second region, whichever is estimated, in terms of frequencies thereof using a combination of the target color and the tracking color stored in the tracking color storer, and update the target color by one of the colors being highest in the evaluation.

6. The target tracker according to claim 5, wherein the particle filter processor is configured for evaluation to be lower in frequency as an evaluated color has increased differences to the target color and the tracking color.

* * * * *